(12) United States Patent
Hopper

(10) Patent No.: US 7,150,424 B2
(45) Date of Patent: *Dec. 19, 2006

(54) TOOL SUPPORT

(75) Inventor: Michael B. Hopper, Worcester, MA (US)

(73) Assignee: Michael Blair Hopper, Worcester, MA (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/918,729

(22) Filed: Aug. 13, 2004

(65) Prior Publication Data

US 2005/0051406 A1 Mar. 10, 2005

Related U.S. Application Data

(63) Continuation-in-part of application No. 10/408,583, filed on Apr. 7, 2003, now Pat. No. 6,805,314, which is a continuation-in-part of application No. 09/818,162, filed on Mar. 27, 2001, now abandoned.

(60) Provisional application No. 60/574,516, filed on May 26, 2004, provisional application No. 60/558,938, filed on Apr. 2, 2004.

(51) Int. Cl.
*B65H 75/48* (2006.01)

(52) U.S. Cl. ............... 242/375.1; 242/376; 242/377; 242/399.1; 242/484; 242/380; 248/330.1

(58) Field of Classification Search ............ 242/375.1, 242/376, 377, 397.3, 399.1, 484, 484.1, 380; 248/579, 52, 330.1
See application file for complete search history.

(56) References Cited

U.S. PATENT DOCUMENTS

| 760,801 | A | | 5/1904 | Nichols |
|---|---|---|---|---|
| 2,070,196 | A | | 2/1937 | Black |
| 2,462,296 | A | | 2/1949 | Yirava |
| 2,702,674 | A | | 2/1955 | Willson et al. |
| 2,756,945 | A | | 7/1956 | Robboy |
| 3,062,479 | A | | 11/1962 | Griffitts |
| 3,075,724 | A | | 1/1963 | Stahmer |
| 3,093,342 | A | | 6/1963 | Krohn |
| 3,162,395 | A | | 12/1964 | Bray |
| 3,305,103 | A | | 2/1967 | Hilstrom |
| 3,384,321 | A | | 5/1968 | Becker et al. |
| 3,615,065 | A | | 10/1971 | Elliott |
| 4,003,552 | A | | 1/1977 | Sobolewski |
| 4,655,399 | A | | 4/1987 | Harvey |
| 4,897,512 | A | | 1/1990 | Johnston |
| 5,054,162 | A | | 10/1991 | Rogers |
| 6,065,705 | A | | 5/2000 | Schmitt |
| 6,805,314 | B1 | * | 10/2004 | Hopper .................... 242/375.1 |

* cited by examiner

*Primary Examiner*—William A. Rivera
(74) *Attorney, Agent, or Firm*—Sampson & Associates P.C.

(57) ABSTRACT

A support assembly is provided for suspending lightweight tools or other objects, such as hairdryers and the like. The assembly provides support and in particular embodiments, electrical power to the object suspended. In addition, the assembly provides management of the power cord. Embodiments of the assembly include a quick release electrical connector deployed between and configured to selectively electrically connect and disconnect the tool from a power supply and/or a gimbal assembly configured to permit rotation of the tool about first and second axes, the cord extending through the gimbal assembly.

43 Claims, 29 Drawing Sheets

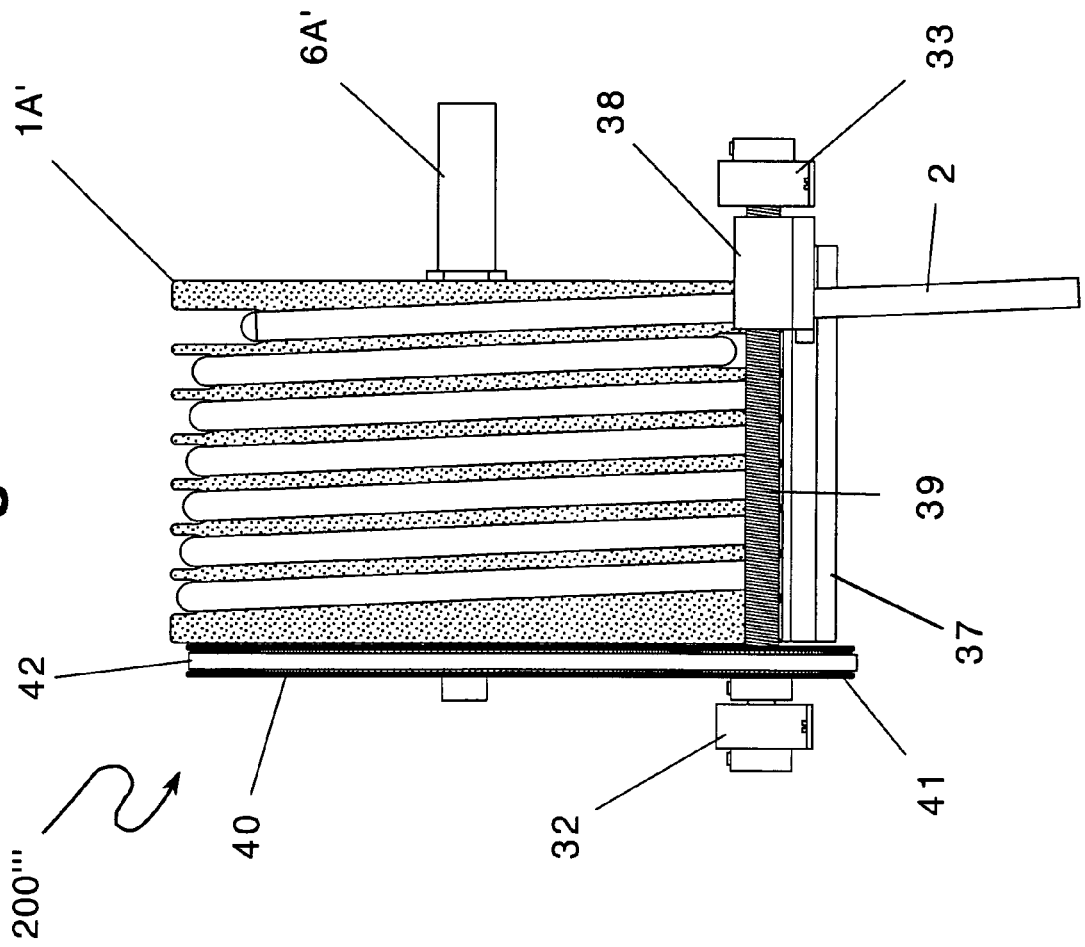

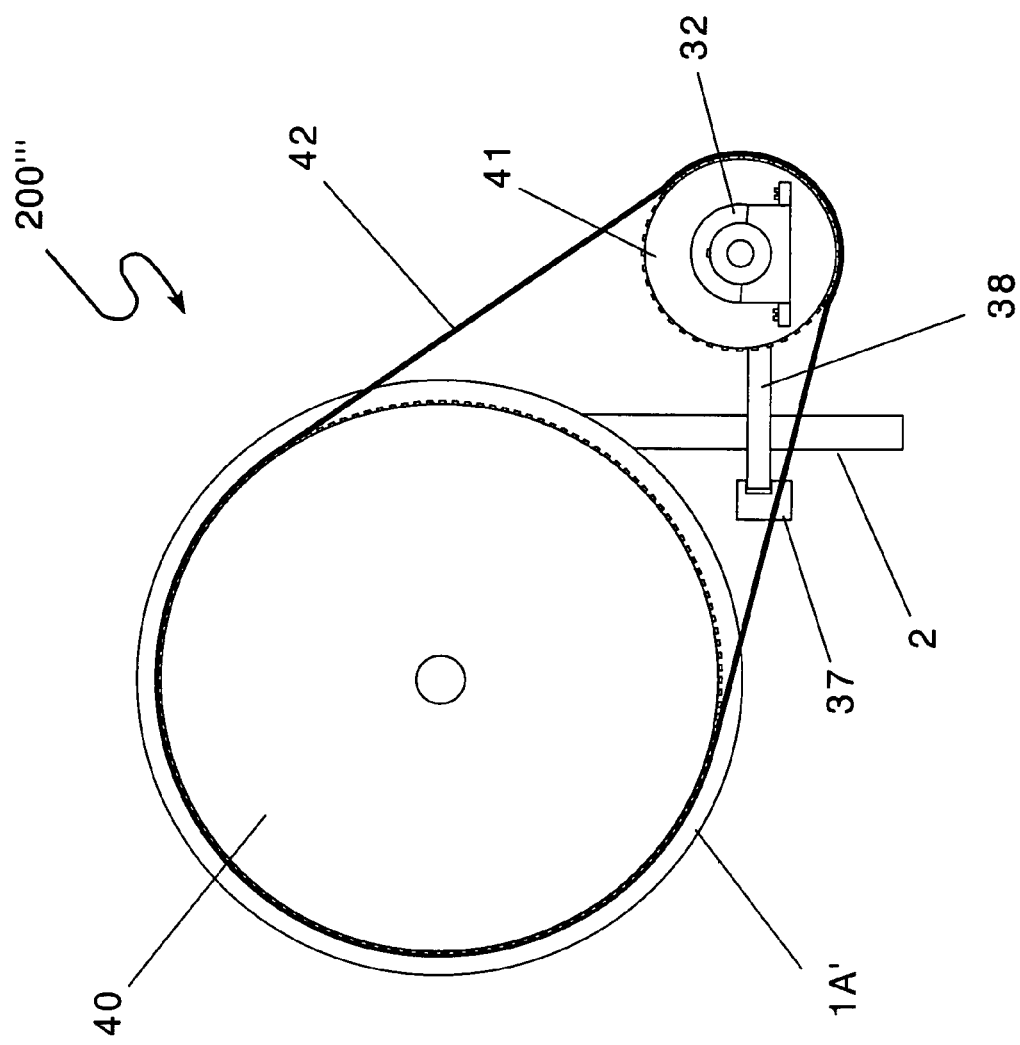

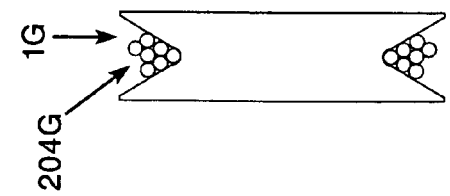
Fig. 12G
Fig. 12
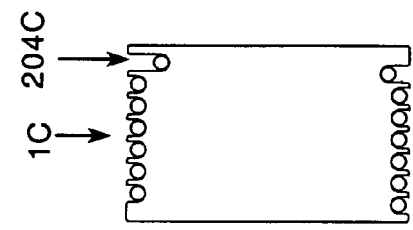
Fig. 12C
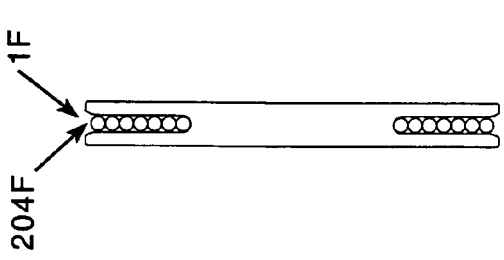
Fig. 12F
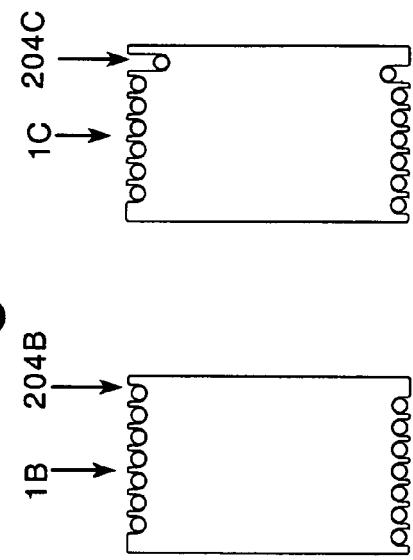
Fig. 12B
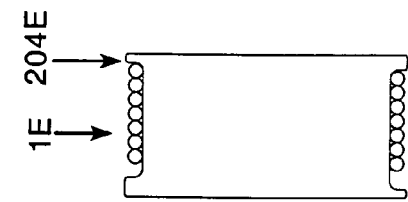
Fig. 12E
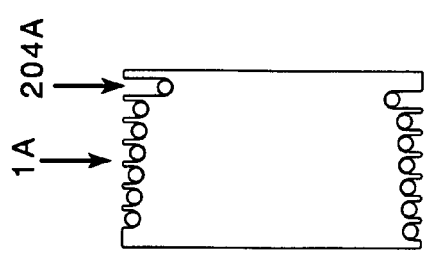
Fig. 12A
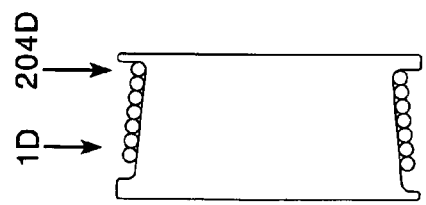
Fig. 12D

TOOL SUPPORT

RELATED APPLICATIONS

This application claims the benefit of U.S. Provisional Applications Ser. No. 60/558,938, entitled Connector, filed Apr. 2, 2004 and Ser. No. 60/574,516, entitled Connector, filed May 26, 2004. This application is related to, and is a Continuation-In-Part of U.S. patent application Ser. No. 10/408,583, entitled Tool Support, filed on Apr. 7, 2003, now U.S. Pat. No. 6,805,314, which is a Continuation-In-Part of U.S. patent application Ser. No. 09/818,162, entitled Tool Support, filed on Mar. 27, 2001 (now abandoned).

BACKGROUND

1. Technical Field

This invention relates to retractable overhead tool supports, and more particularly to a low-drag overhead support for lightweight hand-held tools such as hairdryers. This invention further relates to a quick release electrical connector and a gimbal assembly for lightweight hand-held tools.

2. Background Information

In various industries, hand tools and other utilitarian devices are used by workers on a daily basis. Many of these devices are heavy, and require considerable arm strength to lift, hold in place, and maneuver. Weight compensating suspension devices may be desired to support relatively heavy objects from above, such as to support engine blocks and the like in automobile assembly lines. These devices enable the heavy objects to be conveniently moved to or along the production line, enabling workers to rotate them for convenient access, e.g., to attach components, or to lower them into position, such as into an engine compartment of an automobile. In order to support such heavy objects, these suspension devices may be fabricated from relatively heavy components to provide them with requisite structural integrity. These suspension devices, by virtue of their intended use and structural requirements, therefore tend to have relatively high inertial mass. Such devices also tend to exhibit relatively high frictional forces during use.

As mentioned above, the supported objects are themselves heavy and as such, are typically moved into desired position slowly, and once so positioned, e.g., at a desired elevation within an assembly line, or within an engine compartment of an automobile, are seldom moved elevationally again, if at all. Accordingly, for such applications, the mass, inertia, and friction of the suspension device is of little adverse affect.

However, such suspension devices are less than optimal for use with relatively lightweight objects, such as hairdryers and other hand tools, which have relatively low mass, and which are often moved rapidly between various elevations. For example, hair stylists use hand-held hair dryers, which often must be held for extended periods of time and maneuvered quickly and repetitively between various elevations, sometimes in tandem with a hairbrush while drying or styling.

Even when appropriately scaled down in size to compensate for the lighter weight of such objects, conventional suspension devices of the type described above have generally proven deficient in one or more respects. For example, such devices tend to either provide too much, or too little compensating (e.g., upward) force and the cords used to attach these devices to the supported object tend to bind during rapid elevational changes (i.e., during rapid raising and lowering). Furthermore, during such rapid elevational movement, such as during the hair styling/drying action described above, there may be a lag between raising the hairdryer, and the corresponding retraction of the cord. This lag may result in the cord becoming alternately loose, and then taut, to provide non-uniform tool support which may be disruptive to the user. Moreover, the momentary lag may result in a subsequent retraction at an excessive rate of speed, as the device attempts to reel in 'slack' in the cord. Alternatively, the device may attempt to retract the cord even as the user attempts to lower the object, which may be further disruptive, and may place undue stress on the user's wrist and on various components of the suspension device, etc. This uneven application of force generated by such a lag may also result in components of the device disadvantageously cocking or jamming.

It is therefore desirable to provide an improved suspension apparatus for lightweight objects such as hairdryers and other hand tools, which renders them apparently or virtually weightless, while enabling them to be frequently and quickly moved between various elevations while also providing lateral freedom of movement. In certain applications it is also desirable to provide such suspension apparatuses with an electrical connector to ensure a stable power supply to the hand tool, as well as to provide quick and easy connection and disconnection of power to the tool. In other applications it is further desirable to provide such suspension apparatuses with a gimbal assembly to provide additional degrees of freedom of motion to the tool.

SUMMARY OF THE INVENTION

In one aspect this invention includes a multi-elevational tool support. The tool support includes a drum disposed to rotate about a central axis, a spring disposed to bias rotation of the drum, and a cord coupled at a proximal end thereof to the drum. The tool is coupled to a distal end of the cord and the cord is configured to supply power to the tool. The tool support further includes a quick release electrical connector deployed between and configured to selectively electrically connect and disconnect the proximal and the distal ends of the cord and/or a gimbal assembly deployed between the proximal and the distal ends of the cord, the cord extending through the gimbal assembly, the gimbal assembly configured to permit rotation of the tool about first and second axes. The drum is configured to windingly receive the cord therearound and the cord is configured for being alternately wound and unwound with and against the bias of the spring as the tool is respectively raised and lowered. The drum is further configured for moving axially during the alternate winding and unwinding. The tool support further includes an axially stationary entry and exit point through which the cord alternately disengages and engages the drum during the alternate unwinding and winding. The spring is coupled to the drum and is configured for remaining axially stationary during the axial movement of the drum.

In one variation of the above-described aspect, the connector further includes a first plurality of teeth disposed on a first portion thereof and a second plurality of teeth disposed on a second portion thereof. The first and second pluralities of teeth are configured to selectively engage and disengage one another upon connecting and disconnecting the connector and the engagement of the teeth is operative to substantially prevent relative axial motion between the first and second portions of the connector. In another variation of the above-described aspect, the connector includes a first lock deployed on a first portion thereof and a second lock deployed on a second portion thereof, the second lock being configured to rotate about a longitudinal axis of the second portion between first and second rotational positions and being biased towards the first rotational position. The second lock is in the second rotational position when the connector is connected. The first and second locks are configured to engage and disengage one another upon connecting and disconnecting of the connector, said engagement of the first and second locks operative to substantially prevent relative axial motion between the first and second portions of the electrical connector.

In another variation of the above-described aspect, the gimbal assembly includes a gimbal deployed about a receptaclel. The gimbal is disposed to rotate about the first axle. The first axle extends through the gimbal and the receptaclel. The gimbal includes a second axle, the gimbal and receptaclel disposed to rotate together about the second axle. The second axle is substantially orthogonal to the first axle and is supported by an internal receptaclel. The gimbal assembly further includes a wedge deployed in the receptacle, the wedge including first and second wire channels that are disposed to receive corresponding first and second electric lines. In this variation the gimbal assembly still further includes a cable jacket deployed about the central component. The cable jacket is secured between the receptacle and the wedge to resist axial movement of the cable.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 10 is an elevational view of the embodiment of FIG. 9;

FIG. 11 is a front view of the embodiment of FIG. 10;

FIGS. 12A–12G are elevational schematic views of various drum configurations useful in accordance with various embodiments of the present invention;

DETAILED DESCRIPTION

Figure 1:
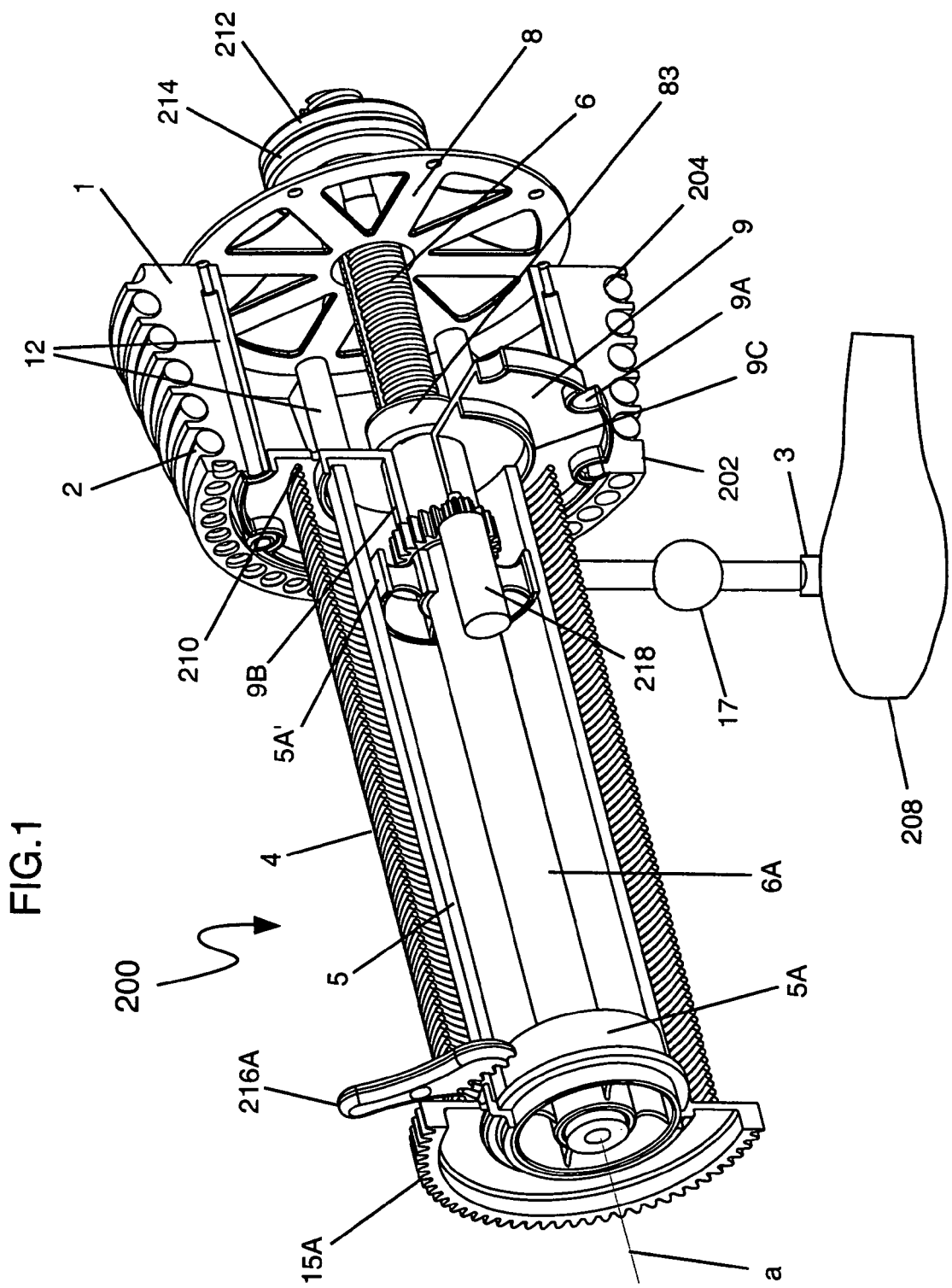
FIG. 1 is an elevational view of an embodiment of the present invention, in conjunction with a hairdryer shown on a reduced scale.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Where used in this disclosure, the term "axial" when used in connection with an element described herein, refers to a direction relative to the element, which is substantially parallel to axis of rotation a when the element is installed such as shown in FIG. 1. Similarly, the term "transverse" refers to a direction substantially orthogonal to the axial direction. The term "drag", as used herein, refers to forces tending to resist the elevational changes of an object supported by embodiments of the present invention. These "drag" forces may include friction and inertia exhibited by various components of these embodiments.

An aspect of the present invention was the realization that lack of success using conventional counter-balancing suspension systems was related to the relatively high drag, e.g., inertia and friction, associated with such devices. Moreover, it was found that even when such systems are scaled-down in size in an attempt to accommodate lighter weight (e.g., about 1–25 lbs.) suspended objects, the drag forces become a significant, if not overwhelming factor, particularly for objects in the lower end of this weight range. Indeed, although various componentry may be reduced in size to compensate for lighter weight objects, the drag forces generated by friction and inertia of the moving components, were not proportionately reduced. As such, the ratio of drag forces to the weight of the object became unacceptably high, with the effect of exacerbating the 'lagging' problem associated with quick elevational movements as described hereinabove.

Embodiments of the present invention address the aforementioned drawbacks by providing a low drag (low inertia, low friction) aerial suspension system configured for nominally weightlessly supporting a lightweight object (i.e., in the range of about 1 to about 25 pounds, and in particular embodiments, about 1–5 pounds), including hairdryers and other hand tools, to enable rapid elevational movements. In addition, these embodiments provide a convenient system for controlling power cords associated with such tools, since any excess cord not needed to support the object in its current position is coiled automatically. The cord is managed to nominally eliminate binding during extension, nor bunching during retraction. These embodiments also provide nearly uniform compensatory (upward) force throughout the operational range of cord extension. These embodiments also provide for conveniently storing the suspended objects. For non-electrical objects, the electrical cord can be replaced with a support cord, and the mechanism for bringing power to the cord need not be present.

In addition, the amount of force necessary to extend the object may be adjusted. Applying a relatively slight amount of upward lift on the object may initiate retraction of the cord. Furthermore, cord retraction may be stopped at any position simply by removing the upward lift on the object. The object may be retracted to a preset "home" position that requires additional force to dislodge the object therefrom. Embodiments of the present invention also advantageously provide support for a tool such as a hairdryer, while providing it with six degrees of freedom (i.e., x, y, z, $\theta_x$, $\theta_y$, and $\theta_z$) of movement.

Figure 2:
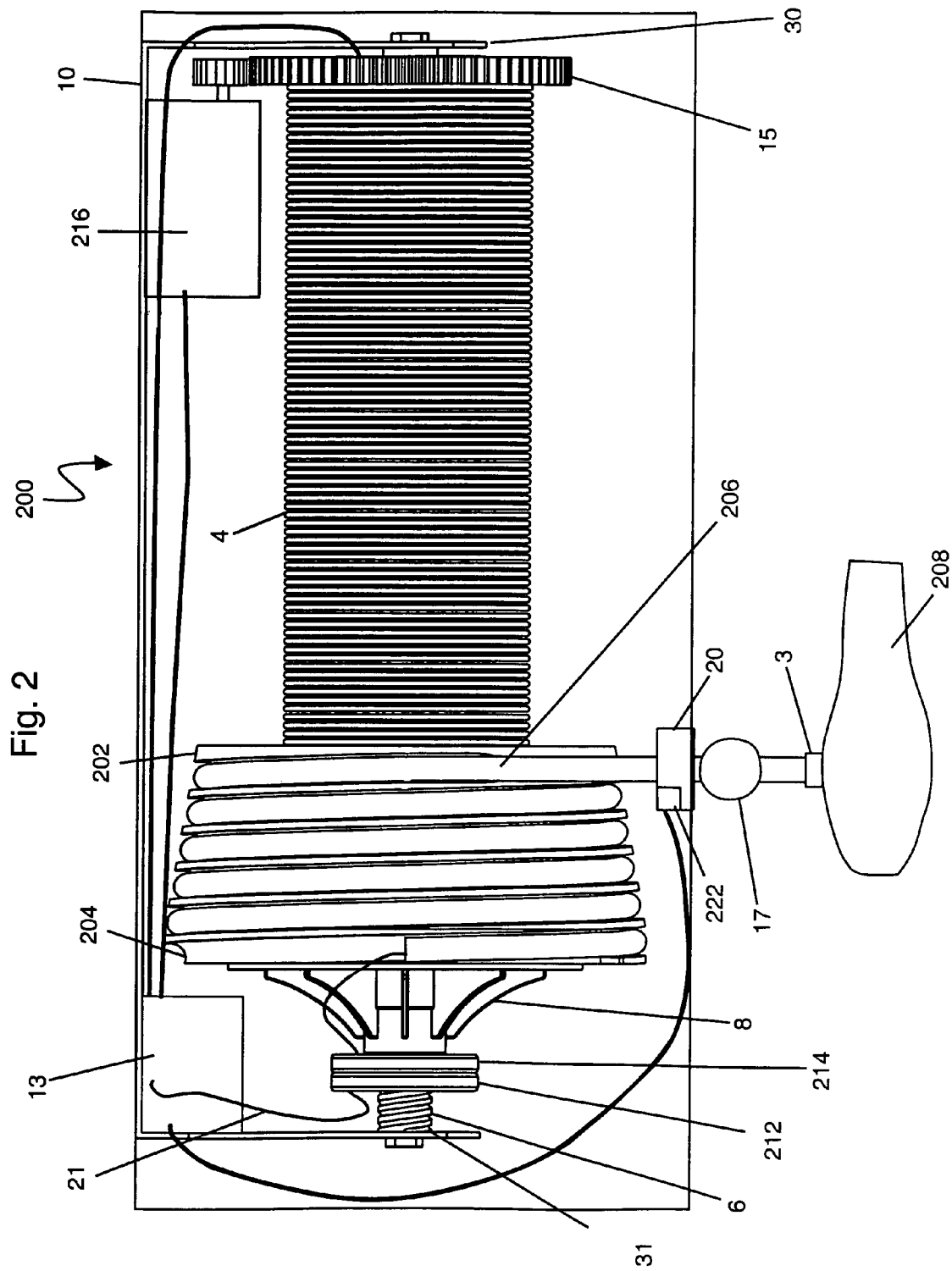
FIG. 2 is another view of the embodiment shown in FIG. 1.

Turning now to the Figures, one embodiment of the present invention is shown in FIGS. 1 and 2 as suspension system 200. System 200 includes a drum 1 configured to rotate about a central axis a and a spring 4 operatively engaged with the drum to bias rotation of the drum about the axis. Drum 1 includes an exterior surface 202, which, though not required, in the embodiment shown is substantially frusto-conical. Surface 202 defines a helical path 204 thereacross, which, in this particular embodiment, is configured in the form of a helical channel disposed within surface 202. Several alternative drum configurations, e.g., in which surfaces or portions thereof are not frusto-conical, and/or the paths or portions thereof are not helical or are not defined by a channel, are discussed hereinbelow with respect to paths 204B–204G of FIGS. 12B–12G.

As shown, a proximal end of a cord 2 is fastened to drum 1, and is configured for being alternately wound and unwound about drum 1 along helical path 204 as the drum rotates about axis a. During this winding and unwinding, cord 2 enters and exits path 204 (i.e., the cord engages and disengages the drum) at entry/exit point 206, and extends to a distal end fastened directly (or via a connector 3) to an object such as a hairdryer 208. In the particular embodiment shown, entry/exit point 206 and spring 4 are axially stationary relative to one another during the winding and unwinding of cord 2, and in this particular embodiment, both point 206 and spring 4 are axially stationary, e.g., while the drum slides axially, as discussed in greater detail hereinbelow. Thus, although point 206 will move axially relative to the drum 1 as the drum rotates, point 206 remains stationary relative to axis a and to a user. Such axial stability advantageously reduces the overall inertia (and thus lowers the drag) of apparatus 200 by minimizing both the number of moving parts and the extent of movement of those parts. This axial stability also nominally eliminates offset torque on the drum to further reduce drag on the apparatus.

Optional aspects of these embodiments include disposing the drum engaging portion 210 of spring 4 in substantial transverse (radial) alignment with entry/exit point 206. Such alignment effectively precludes the formation of an axially extending moment arm between the application of opposite, compensating, forces applied at these locations. The skilled artisan will recognize that such configuration will effectively minimize or substantially eliminate any propensity for the drum 1 and/or spring 4 to cock or twist relative to axis a during rapid elevational movements of the object.

Turning now to FIGS. 1 and 2 in greater detail, embodiment 200 may further include a mandrel 5, a thrust plate 8, a torque converter 9, a slip ring assembly 11, and a spring tension adjuster 15, all disposed on a threaded main shaft portion 6. As shown, thrust plate 8 may include a nut at its center, configured to threadably receive the threaded shaft portion 6 therein. Thrust plate 8 is rigidly coupled to drum 1 so that the drum rotates with plate 8 about shaft portion 6. As mentioned above, drum 1 may include a frusto-conical exterior surface 202, which optionally includes a helical channel 204 configured to receive a suitably sized cord 2 therein.

In desired embodiments, drum 1 is formed as a hollow annulus, with an interior surface having a plurality of axially extending bearing rods 12 disposed in spaced relation thereon. As also shown, torque converter 9 is configured as a disc having a central sleeve 9B sized to slidably receive shaft portion 6 therein. Converter 9 also includes a series of circumferentially spaced cutouts 9A sized and shaped to slidably engage the bearing rods 12. This sliding engagement of the rods 12 with the cutouts 9A serves to rotationally couple drum 1 to the torque converter 9, while enabling the drum 1 to slide axially relative to the converter 9. Moreover, the sliding fit of sleeve 9B enables torque converter 9 to rotate relative to shaft portion 6, without traveling axially relative thereto. Axial movement may be prevented, for example, by use of retainer clips 80. Torque converter 9 also includes a circular ridge 9C concentric with the main shaft portion 6. The radially innermost edge of the circular ridge 9C is sized to matingly engage one end of mandrel 5, while the radially outermost edge of the circular ridge 9C may be sized to matingly engage with an inner diameter of one end of spring 4 (FIG. 2). The ridge 9C and/or spring 4 are preferably sized and shaped to provide a snug fit, and the spring is securely attached thereto in any convenient manner sufficient to nominally prevent rotational slippage during operation, as discussed hereinbelow. A support bracket 10 (as shown in FIG. 2) may be used to hold the drum 1 and spring 4 in their desired positions relative to one another.

Figure 7:
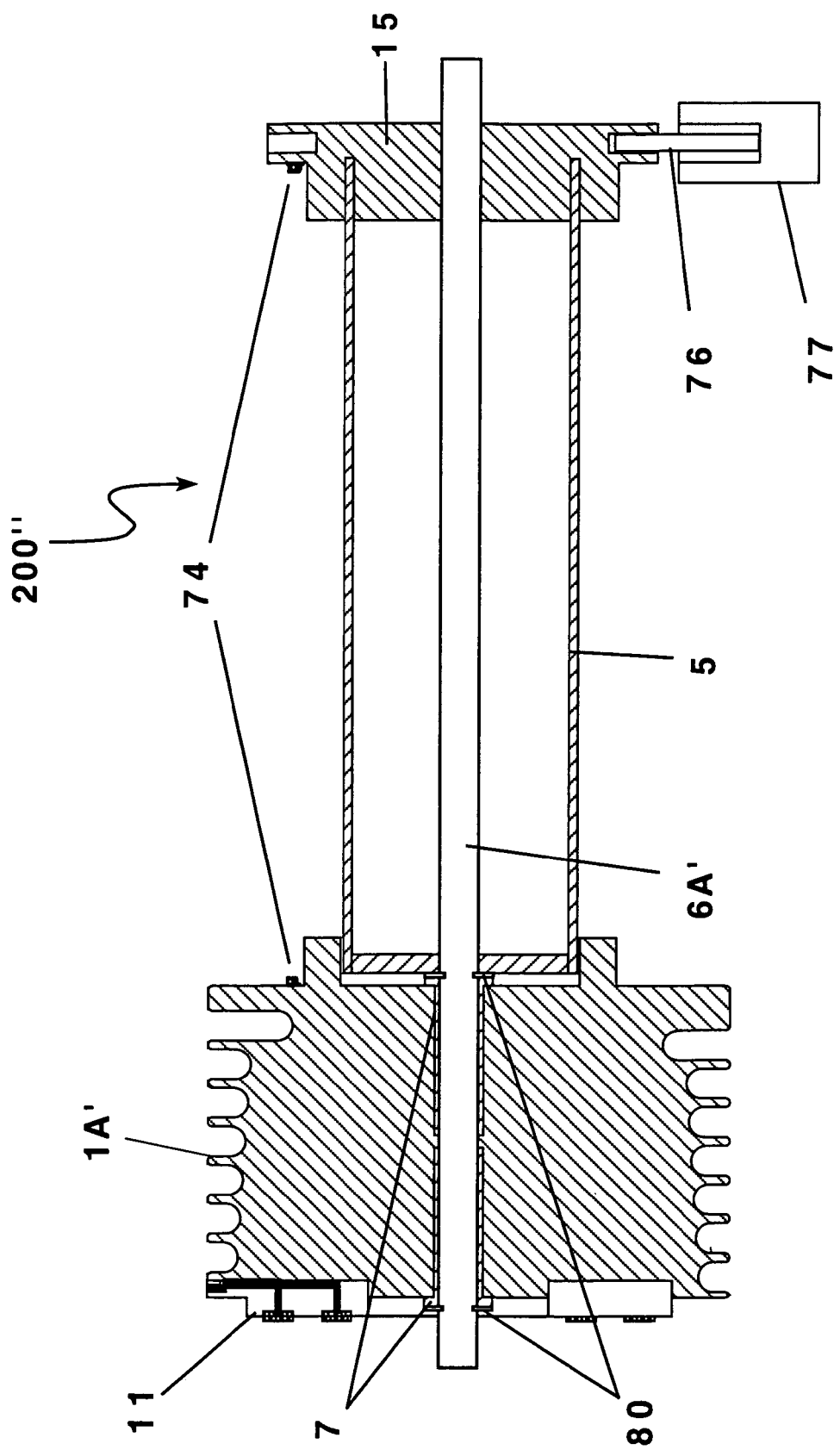
FIG. 7 is an elevational cross-sectional view of portions of the embodiment shown in FIG. 5.
Figure 8:
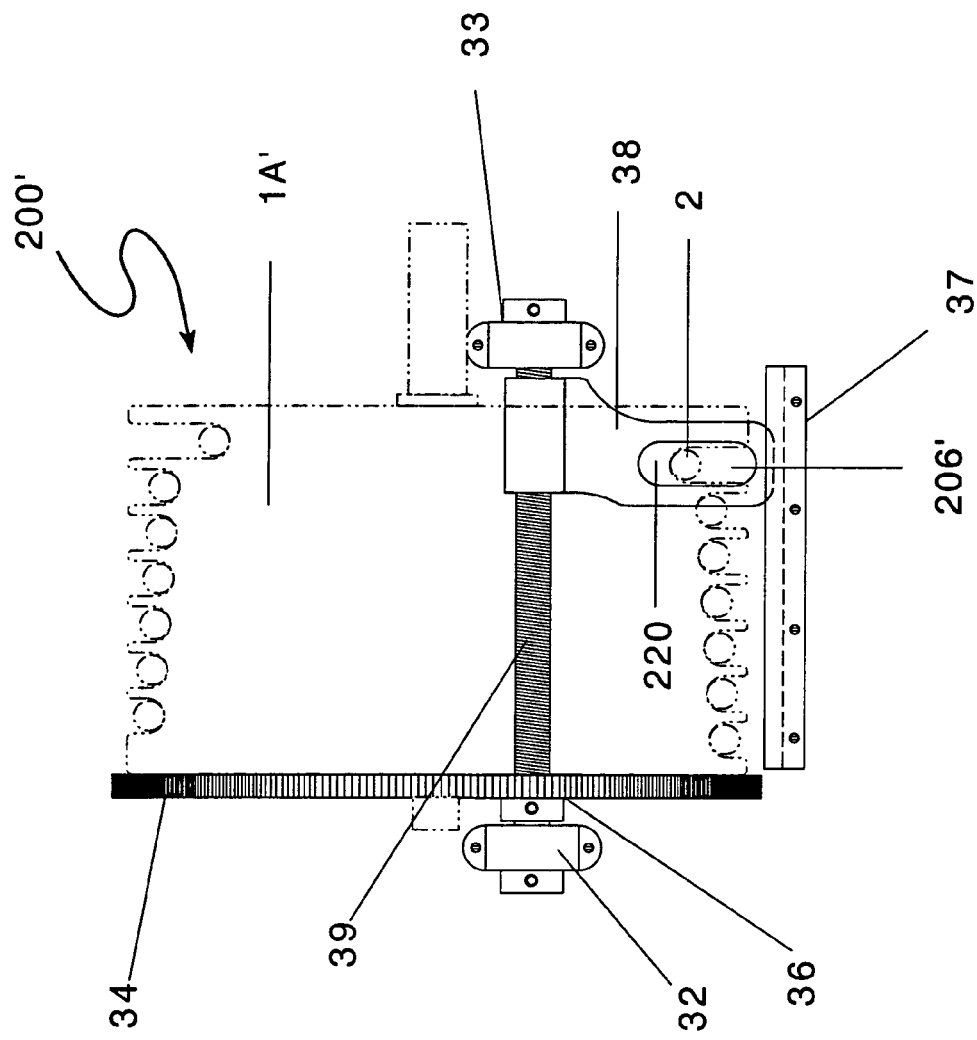
FIG. 8 is a top view, with portions shown in phantom, of portions of the embodiment of FIG. 5.

As discussed hereinabove, the frusto-conical surface 202 of drum 1 may be provided with a helical channel 204 configured to hold the cord 2 in a wrapping configuration as shown in FIG. 2. As shown, the radius of frusto-conical surface 202, and of the helix formed by channel 204, increases gradually along the length of the drum. The skilled artisan will recognize that this progressive radius of channel 204 advantageously enables the weight of tool (e.g., hairdryer) 208 to provide progressively increased torque to drum 1 as the cord is unwound, to compensate for increased torque generated by spring 4 as it is moved against its bias. Such compensation may advantageously be used to maintain a substantially neutral or weightless feel to tool 208 during operation of system 200, as will be discussed in greater detail hereinbelow. The radius of path 204 at particular axial locations may be determined by the particular spring 4 used, the weight of a particular tool 208, and the added weight of the unwound portion of the cord 2 as it is extended. Moreover, in particular embodiments, the radius may decrease relatively dramatically at the smallest diameter portion of the drum to help retract the tool into the stowed position, as best seen in FIG. 7.

In the embodiment shown, drum 1 and entry/exit point 206 move axially relative to one another during winding and unwinding. In the particular embodiment shown in FIGS. 1 and 2, this is accomplished by the threaded engagement of thrust plate 8 with the threads of shaft portion 6, so that the drum travels axially along shaft 6 as it rotates. The magnitude of axial movement is determined by the pitch of the threads, which is configured so that the cord 2 will not complete a rotation on top of itself, and thus nominally keep it from binding or jamming as it winds and unwinds. In the particular embodiment shown, the thread pitch is configured to match that of the helical path 204 so that the entry/exit point 206 remains radially aligned with the path 204 throughout the range of drum rotation.

In particular embodiments, threads of shaft portion 6 may be configured as conventional multiple start (e.g., 5-start) threads, as may be desired to support the drum.

Figure 5:
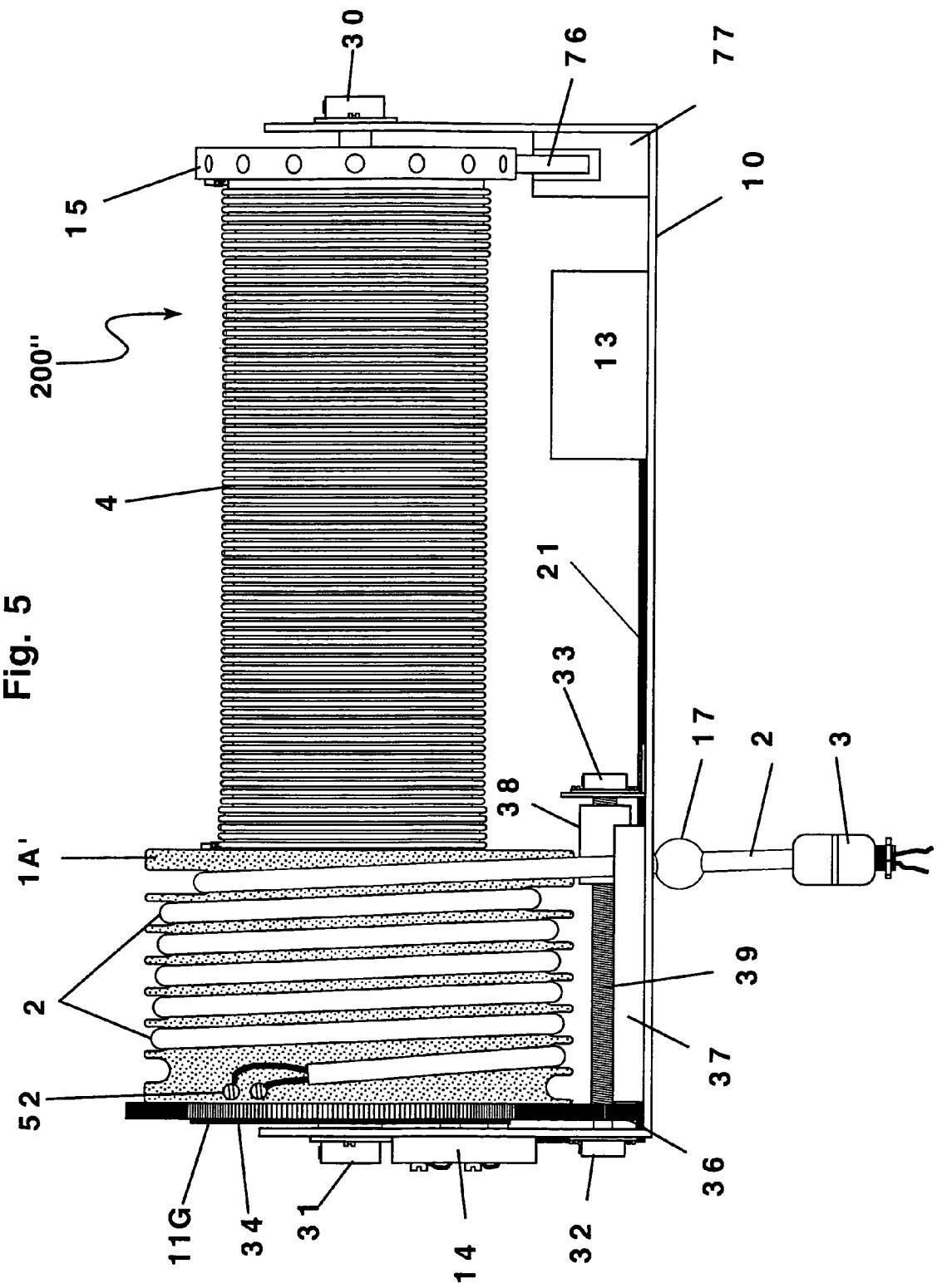
FIG. 5 is an elevational view of another embodiment of the present invention.
Figure 6:
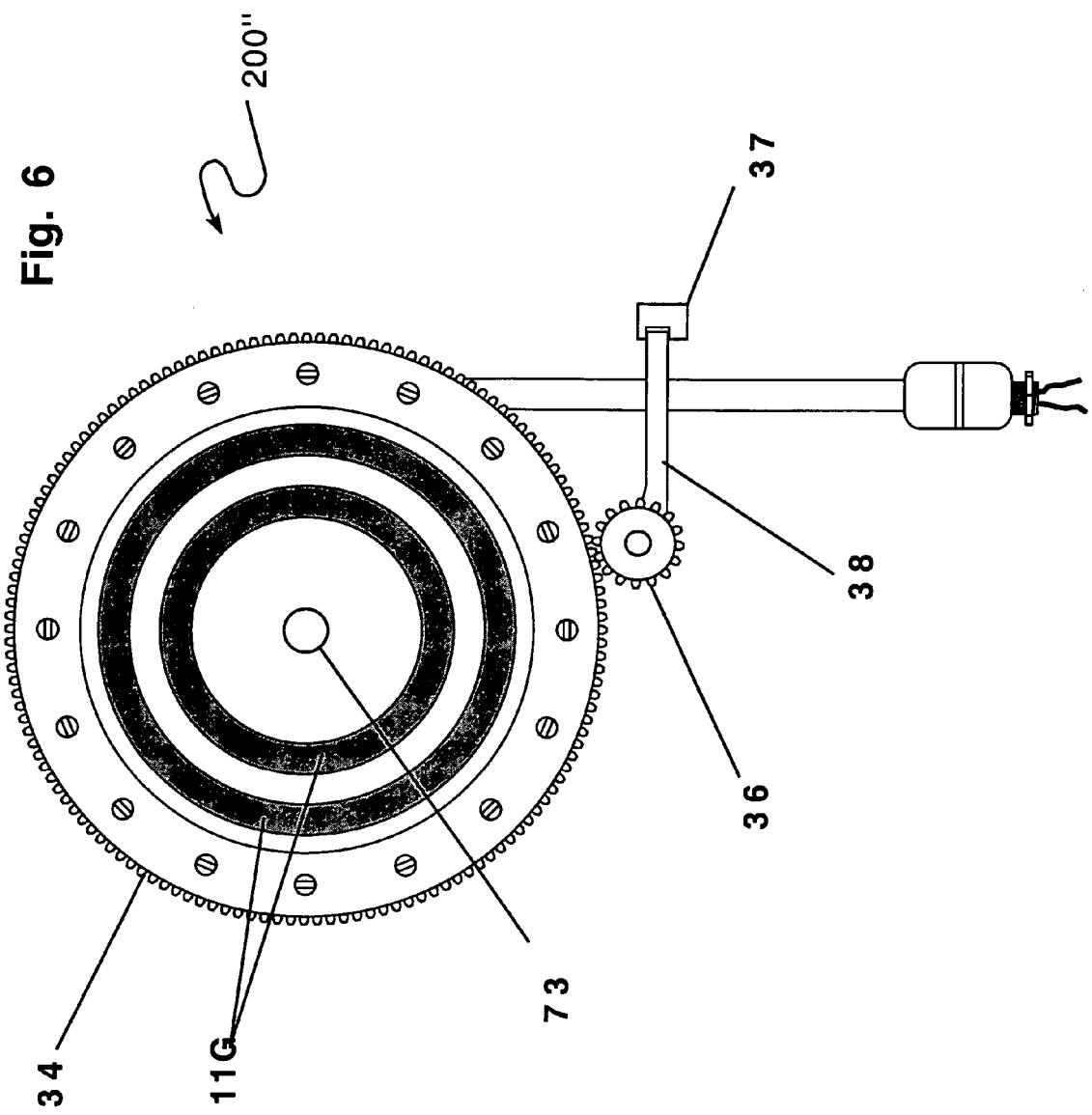
FIG. 6 is a front view of a portion of the embodiment shown in FIG. 5.

In embodiments in which the cord 2 is an electrical cord, electricity may be transferred from a suitable source, such as a 110 volt AC line voltage source (not shown), to a conventional slip ring assembly 11 having a pair of slidably engagable rings 212, 214. In the embodiment shown, ring 212 does not rotate, but moves axially and may be connected to the source, while the other ring 214 may be integrally fastened to thrust plate 8 to rotate therewith. Ring 214 may then be connected to the proximal end of cord 2, such as by terminals 52 (FIG. 5). In this manner, electricity may be conveniently transferred from a stationary source to the rotatable portions of system 200. Optionally, as mentioned hereinabove, cord 2 may terminate at its distal end at an electrical plug-type connector 3, which enables a user to conveniently connect and disconnect the cord to tool 208. Moreover, although cord 2 has been described herein as an electrical cord, the skilled artisan will recognize that in the event the tool or object does not require connection to a remote electrical source, the cord may simply be used to suspend the tool. The term "cord" is thus not to be construed as limiting, and includes string, rope, chain, wire or other material of sufficient strength and dimension to fulfill the function herein described.

As also shown, mandrel 5 is disposed within spring 4, in spaced, concentric orientation therewith. Mandrel 5 is sized to support the center of the spring 4 during operation of system 200, to prevent the spring from oversagging at its central portion. In this regard, mandrel 5 may be provided with an outer diameter that is as large a possible, while still being smaller than the smallest inner diameter of the spring 4 when the spring 4 is wound to its operational limit (e.g., when the cord 2 is fully unwound from the drum 1). As mentioned hereinabove, the mandrel is supported at one end by ridge 9C of torque converter 9. The other end of mandrel 5 is supported by mandrel spacer 5A which has an inner bearing surface configured to rotatably engage unthreaded shaft portion 6A as shown. Optionally, one or more additional spacers 5A' may also be provided as desired to further support the mandrel 5. Spacer 5A is coupled to spring tension adjuster 15. Adjuster 15, once adjusted as described hereinbelow, is configured to be stationary during operation of system 200. This also effectively maintains mandrel 5 in stationary orientation during operation. In the embodiments shown, spring 4 is a coil torsion spring. The adjusting mechanism 15 adjusts the tension of spring 4 by either manually or automatically (e.g., with a suitable stepping motor assembly 216) rotating the end of the spring coupled to spacer 5A. Such rotation effectively applies a predetermined level of preload, either with or against the spring's bias, to enable a user to fine-tune the amount of force applied by the spring. In this manner, the spring tension may be adjusted depending upon the weight of the accessory 208. In desired embodiments, the configuration described herein advantageously enables adjuster 15 to adjust the force applied by spring 4 over a range of from 0–100 percent (%) of the combined weight of the accessory 208 and cord 2. These embodiments thus permit the compensating (e.g., upward) force to be adjusted within a range of from no compensation (the user feels the full weight of the accessory) to a net upward bias equal to its weight.

The characteristics of the spring 4 are chosen based on factors such as the weight of the accessory 208 to be suspended, the weight of the cord 2 as it is extended, and the radius of helical path 204. In addition, the number of coils of spring 4 is preferably chosen to so that the rotation of each individual coil during operation is minimized. For example, it has been found that springs having a number of coils that is at least eleven times the number of revolutions of path 202, i.e., a ratio of 11:1, is desirable. In such a configuration, during operation, the average rotation of each coil is less than one eleventh that of the drum. In particularly desirable embodiments, a ratio of about 20:1 may be used. A ratio of 30:1 or higher may also be used. It has also been found desirable to coat the spring with a self-lubricating material such as polytetrafluoroethylene (PTFE), e.g., TEFLON® (DuPont Corporation, Delaware) and/or configure the spring so that adjacent coils are spaced from one another, to nominally eliminate any friction therebetween. Various additional factors that tend to contribute to the low drag (low inertia, low friction) aspect of the present invention are discussed hereinbelow.

Having described an embodiment of the present invention, operation thereof will now be discussed. As mentioned above, object 208 may be moved elevationally within a predetermined range of motion defined by an upper starting position, in which the cord 2 may be nominally fully retracted, and a lowermost position, in which the cord 2 may be substantially fully extended. In the starting position, the object 208 is suspended from cord 2, which is fully retracted. The object 208 is either in equilibrium (i.e., net bias neither upwardly nor downwardly), or has a net upward bias (e.g., in the event a helical path 204A having reduced radius (FIGS. 3–5) is used) in this position. If the apparatus is used as only a cord control devise, then the spring tension adjuster can be set so that the object can even have a net downward bias and the user feels the weight of the tool if preferred. As the user pulls on the object, the cord 2 is extended and the drum rotates about the main shaft 6, 6A. As the suspended tool 208 is drawn from system 200, the cord 2 unwinds, which rotates drum 1 and thrust plate 8 coupled thereto. Since the thrust plate 8 is threadably coupled to threaded shaft portion 6, as discussed above, this rotation serves to move the drum/plate assembly axially along the threaded main shaft portion 6. As the drum 1 rotates and travels, its bearing rods 12 slide axially relative to cutouts 9A of torque converter 9. This serves to rotate the torque converter, which in turn, winds the spring 4 against its bias. As discussed above, the increasing radius of helical path 204, in combination with the increased weight of the unwound cord 2, provides increased torque that effectively compensates for the increased torque generated by spring 4 as it winds, so that as perceived by a user, tool 208 remains virtually weightless as it is moved within its range of motion.

To reverse this action, a slight lift of suspended tool 208 enables spring 4 to unwind, i.e., in the direction of its bias. This unwinding effectively reverses the rotation of torque converter 9, which then rotates drum 1 and consequently the threaded thrust plate 8, causing the drum to travel axially back towards its starting position as cord 2 is wound onto path 204 of the drum. In operation, a tool such as a hairdryer is attached to the end of cord 2, optionally using connector 3. As mentioned hereinabove, depending upon the weight of the tool and/or the user's preference for the amount of resistance provided by the system, spring 4 may be adjusted by rotating spring tension adjuster 15 about axis a. Optionally, such adjustment may be made using motor assembly 216.

In this embodiment, the drum, thrust plate, and slip rings are nominally the only moving parts, and the (axial) length of the spring remains constant. This helps to prevent the spring from cocking and jamming as a spring of this type may have a tendency to do, if it were wound (or unwound) and stretched axially at the same time. In addition, as also discussed hereinabove, the pitch of helical path 204 and threads of shaft portion 6 may be matched, so that the entry/exit point 206 is axially stationary. This also helps to prevent the cord from jamming or binding.

As mentioned hereinabove, various aspects of this embodiment have been provided to minimize the amount of drag (e.g., friction and inertia) in system 200, to reduce such drag to below 0.5 lbs (0.2 kg), and in particular embodiments, as low as 3 ounces (0.08 kg), i.e., a level of force that is virtually imperceptible to most users, to enable its successful use with relatively lightweight tools 208, for example, those weighing less than about 25 lbs (11.4 kg), and in particular embodiments, those weighing between about 1–5 lbs (0.4–2.3 kg).

Providing this shaft portion with rolled, rather than machined, threads minimizes the friction of parts moving on the threaded shaft portion 6. These rolled threads offer significantly less resistance than conventional machined threads since the sharp edges and microscopic machining burrs common to such conventional threads are substantially eliminated. In addition the rolled threads and/or the threads of thrust plate 8 may be coated with PTFE, e.g., TEFLON® or other suitable self-lubricating materials to further reduce their friction. Sliding components, such as cutouts 9A and sleeve 9B, may also be fabricated from self-lubricating, or otherwise lubricious or low friction materials such as DELRIN® (Dupont Corporation). Moreover, the moving components are preferably fabricated from relatively lightweight and structurally rigid materials, such as molded ABS. This advantageously reduces the inertial mass of the moving parts. Additional, optional functionality may be added to the present invention by adding a torque-adjusting motor assembly 216 to facilitate adjusting the resistance of spring 4 remotely, as discussed hereinabove. Controls for such an assembly 216 may be disposed on the suspended tool or on connector 3. In addition, a stow-away motor assembly 218, including a conventional gear train, may be coupled to shaft portions 6 or 6A, to raise and lower the tool remotely, for example in the event system 200 is installed on a high ceiling.

Moreover, in the embodiment shown, the threads are oriented so that extending (unwinding) cord 2 moves the drum axially towards unthreaded shaft portion 6A. However, the threads orientation (and the drum itself) may be reversed, so that the drum moves in the opposite axial direction during unwinding, without departing from the spirit and scope of the present invention.

Figure 3:
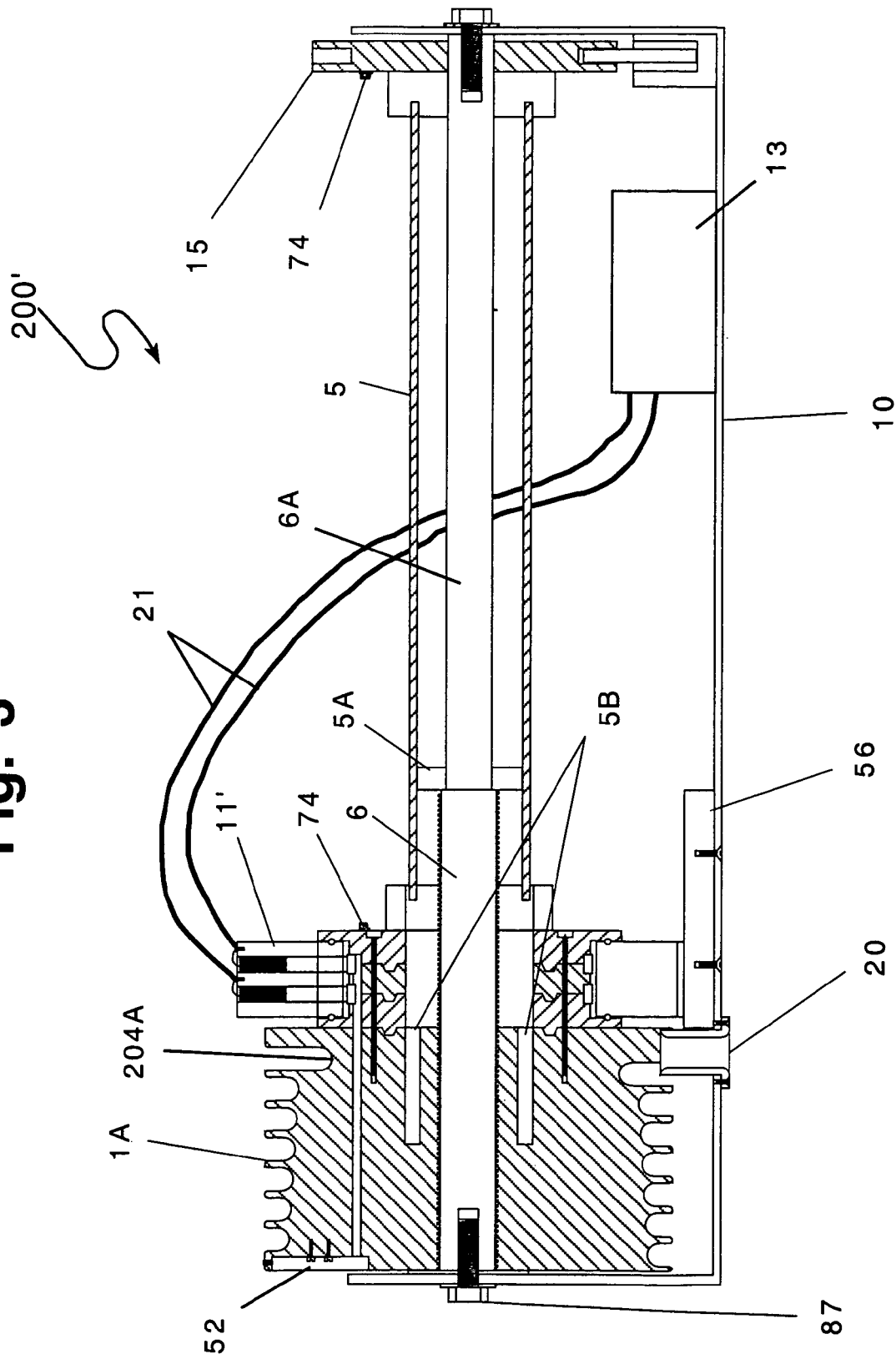
FIG. 3 is an elevational, cross-sectional view of portions of another embodiment of the present invention.
Figure 4:
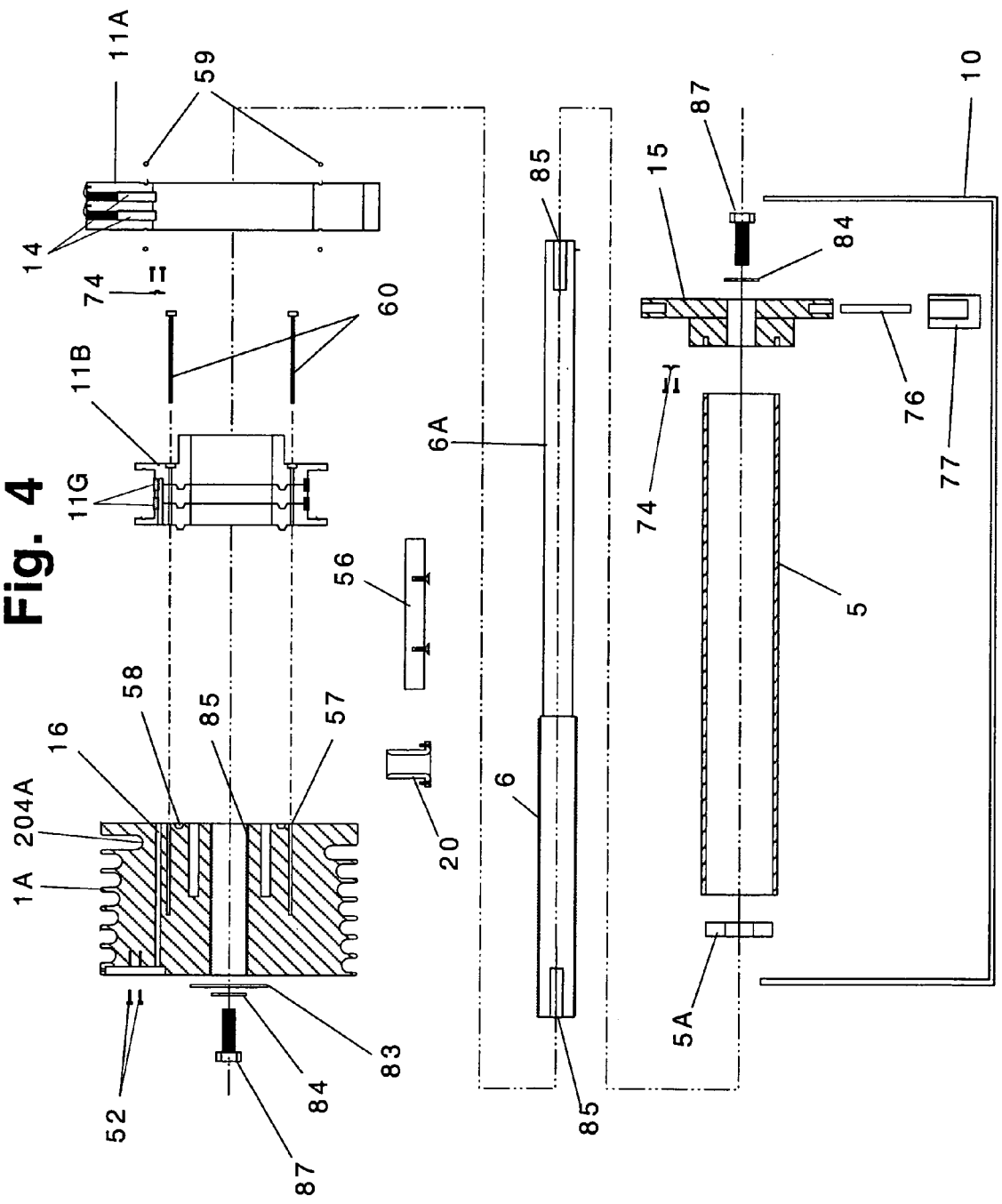
FIG. 4 is an exploded cross-sectional view of the embodiment of FIG. 3.

Turning now to FIGS. 3–4, an alternate embodiment of the present invention is shown as system 200'. System 200' is in many respects similar or identical to system 200 described hereinabove, having distinctions which are discussed hereinbelow. In this embodiment, the main shaft, including portions 6, 6A, is supported by opposite ends of a support frame (e.g., bracket) 10, which includes an opening 20 disposed to align with entry/exit point 206 (FIG. 1). Although bracket 10 and opening 20 are shown with respect to system 200', the skilled artisan should recognize that these components, as well as one or more others shown and described with respect to this embodiment 200', may be interchangeably used with other embodiments, such as system 200, without departing from the spirit and scope of the present invention. The skilled artisan will recognize that use of bracket 10 advantageously enables the system 200, 200', etc., to be conveniently mounted, e.g., to a ceiling above a user's workstation.

One difference between system 200' and system 200 described hereinabove, is that rather than using a torque converter 9, in system 200' spring 4 is coupled directly to drum 1A. Thus, in this embodiment, spring 4 moves axially as drum 1A rotates. As shown, the threads of drum 1A and shaft portion 6 are oriented so that extension (unwinding) of cord 2 causes drum 1A to move axially towards mandrel 5, and retraction of the cord 2 causes the drum 1A to move outward away from the mandrel 5. Such a thread orientation advantageously compresses spring 4 axially as it is wound. Although such thread orientation may be reversed, such as in the manner discussed hereinabove with respect to system 200, such orientation would tend to axially stretch the spring as it is wound, which may be undesirable in some applications.

As also shown, an alternate slip ring assembly 11' may be used, being coupled to either (axial) end of the drum 1A. Slip ring assembly 11' includes an inner assembly 11B and an outer assembly 11A. The inner slip ring assembly 11B supports conventional slip (contact) rings 11G and is rigidly coupled to the drum 1A. The outer assembly 11A includes conventional brushes 14 configured to electrically engage rings 11G when assemblies 11A and 11B are rotationally coupled to one another in concentric, interfitting engagement as shown in FIGS. 3 and 4. Inner assembly 11B including slip rings 11G, rotates with the drum 1A, while outer assembly 11A the other portion containing the brushes 1A does not rotate. Assembly 11A may be kept from rotating by any suitable means, such as a notch or detent (not shown) configured to seat or otherwise engage assembly 11A with an non-rotating component, such as bar 56. Any suitable bearings, such as self-lubricating bearing material (e.g., TEFLON®) or ball bearings 59, may be used to effect the rotatable engagement of assemblies 11A, 11B, with one another. Electricity may be supplied to the brushes 14 of outer assembly 11A by wires 21 extending from electrical fixture box 13.

Figure 9:
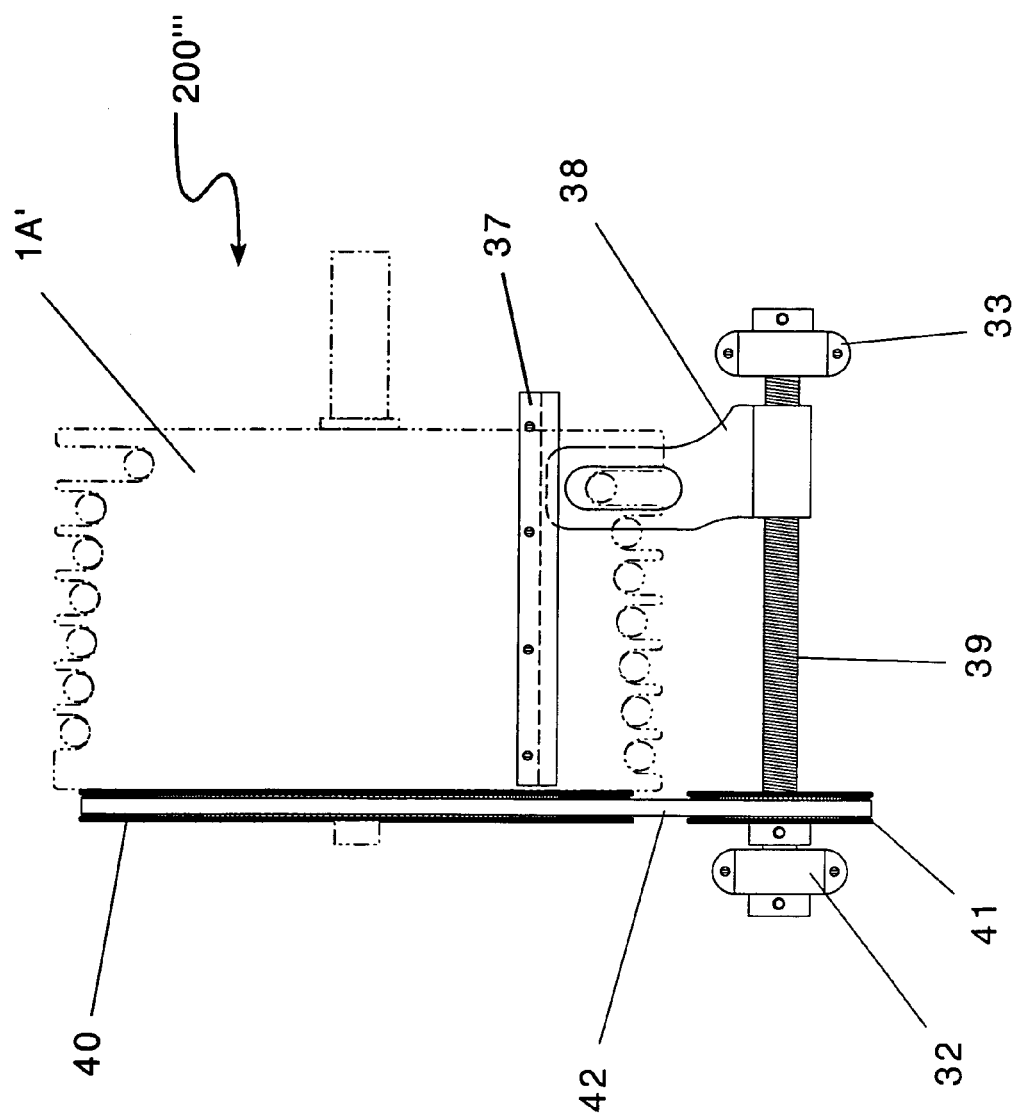
FIG. 9 is a view similar to that of FIG. 8, of portions of an alternative embodiment of the present invention.

Various additional embodiments may include modifications and alternatives to the teachings of systems 200, 200', described hereinabove. Turning now to FIGS. 5–11, system 200", 200'" may be provided, which utilize alternative cord winding approaches including cord tracking mechanisms in combination with an axially stationary (rather than axially movable) drum 1A'. Such mechanisms may be gear-driven (FIGS. 5–8) or may be belt-and-pulley-driven (FIGS. 9–11). In both of these configurations, an unthreaded shaft 6A' is used. A threaded tracking screw shaft 39 is disposed (e.g., by a suitable gear train including gears 34 and 36 (FIGS. 5–8), or by a belt 42 and pulleys 40, in FIG. 8, tracking arm 38 includes an opening 220 through which cord 2 extends, and which moves axially in tandem with entry/exit point 206' during drum rotation, to guide the cord as it winds and unwinds from helical path 204A. This guiding action of opening 220 helps to minimize any tendency of the cord to bind or wind over itself on drum 1A'.

As best shown in FIG. 7, in both the gear driven and pulley driven embodiments, a pair of conventional retainer clips 80 may be used to maintain drum 1A' in an axially stationary position. Suitable low resistance bearings 7 may be provided to allow the drum to freely rotate about the shaft 6A'. The mandrel 5 is held centered along its entire longitudinal length, as one end fits into a circular channel in the spring tension adjuster 15. Although drum 1A' rotates freely, mandrel 5 is not intended to rotate, but need not be secured in any fashion that prevents it from rotating. The retainer clip 80 disposed between drum 1A' and mandrel 5 acts as a spacer, to prevent any friction-generating contact between the drum 1A' and the end of the mandrel 5 as the drum rotates.

Turning back to FIGS. 5–8, during operation of the gear-driven tracking mechanism, as the cord 2 is wound on the drum 1A', the main tracking gear 34 drives the secondary tracking gear 36, which rotates screw shaft 39 about its longitudinal axis. This rotation moves tracking arm 38 axially. The diameters of gears 34, 36, and the pitch of the threads of shaft 39 are configured so that the tracking arm 38 moves axially at the same rate (and direction) as entry/exit point 206' during drum rotation, so that the cord 2, which passes through aperture 220, is properly guided during winding and unwinding, as discussed hereinabove. The skilled artisan will recognize that the belt-and-pulley-driven tracking mechanism, shown in FIGS. 9–11, is substantially similar to the gear-driven approach, but instead of gears 34 and 36, uses a main tracking pulley 40, secondary tracking pulley 41, and tracking belt 42.

As a further option, any of the various embodiments disclosed herein may be provided with a stop 17, such as shown in FIG. 5. The stop acts to prevent further retraction of cord 2 past a predetermined position, to define a 'home' position. As a yet further option, stop 17 may be magnetic, to magnetically engage a portion of frame 10 proximate the entry/exit position. Use of a magnetic stop 17 advantageously enables the use of relatively little upward bias (e.g., in the event the user desires little, if any, compensating force) while still holding the device 208 securely in a home position. The stop 17 is adjustable, so it can be positioned nominally anywhere along the cord, thus allowing the object to hang securely at any of various elevations when in its 'home' position. A switch 222 (FIG. 2), such as a conventional magnetically actuated switch, may also be provided to automatically turn on or cut off power to the device 208 when leaving or returning to the home position, respectively. The skilled artisan will also recognize that power to the device may alternately, or additionally, be controlled manually, such as by a switch located on device 208, on coupling 3 as discussed herein, and/or by any conventional remote control (not shown).

Turning now to FIGS. 12A–12G, additional optional drums suitable for use with any of the embodiments discussed hereinabove are shown. Although these Figures depict several optional drum configurations, they are not exhaustive. The skilled artisan will therefore recognize that drums of virtually any configuration, which are adapted for rotating about a central axis, to wind and unwind a cord thereon, may be provided without departing from the spirit and scope of the present invention. The drum designs selected for a particular implementation of the system 200, 200', etc., depends on choices such as the desired action of the object attached to the cord, whether it is desired for the drum to move axially as it rotates, and if not, whether use of a tracking mechanism is desired. For clarity, the drum variations shown in these FIGS. 12A–12G are oriented so the proximal end of the cord engages path 204 on the right hand side of each drum, and, in the event path 204 is helical, winding progresses towards the left hand side of the drum.

Moreover, although the path 204, 204A has been described hereinabove as being helical, as will be evident in light of the following, embodiments may be provided in which the path is not helical, but rather, the cord is permitted to wind upon itself, such as shown in FIGS. 12F and 12G. The skilled artisan should recognize that such non-helical paths remain within the spirit and scope of the present invention.

Turning to FIG. 12A, drum 1A, as discussed hereinabove, includes a helical path 204A in the form of a channel having a progressive radius, configured to receive cord 2 therein. This drum may be axially stationary (e.g., configured as drum 1A', discussed hereinabove), in which a tracking arm 38 may be used to guide cord 2 during winding/unwinding. Alternatively, drum 1A may be configured to move axially during rotation in order to provide an axially stationary entry/exit point 206 as also described hereinabove. The skilled artisan should recognize that all the drums shown and described herein, may be configured for being either axially movable, or axially stationary, without departing from the spirit and scope of the present invention.

Drum 1B has a helical path 204B defined by channels disposed within a cylindrical surface, which as such, are disposed at a uniform radius along the length of the drum. As such, this drum 1B does not provide for increasing torque as the cord 2 is extended and the spring wound against its bias.

Drum 1C is similar to drum 1B with the exception that path 204C includes a reduced radius portion at one end thereof, to provide the tool with an upward bias when the cord is fully wound, as discussed hereinabove.

Drum 1D has a frusto-conical helical path 204D, which is similar to path 204 of FIGS. 1 and 2, but is not defined by a channel.

Drum 1E is nominally identical to drum 1D, though having a cylindrical, rather than frusto-conical outer surface.

Drum 1F is configured so that cord 2 coils on top of itself to decrease the diameter as the cord 2 is unwound.

Drum 1G is similar to drum 1F, but uses a V-shaped exterior surface to reduce the rate of change of the effective radius as the cord winds and unwinds.

Although the foregoing embodiments have been shown and described using conventional torsion coil springs, the skilled artisan should recognize that substantially any type of biasing devices may be used, including other types of springs such as constant tension springs, clock springs, cantilevered springs, pneumatic devices, and the like, without departing from the spirit and scope of the present invention.

The following illustrative example is intended to demonstrate certain aspects of the present invention. It is to be understood that this example should not be construed as limiting.

EXAMPLE

A support assembly 200', substantially as shown and described in FIGS. 3–4 was fabricated, having the following parameters configured to weightlessly support an object weighing in a range of 1–3 pounds. This assembly was built according to the following parameters:

---

Adjuster

Fiber reinforced ABS plastic using a spur gear with a 20° pressure angle.
Mandrel Thin wall (.08") ABS plastic. 2.5" O.D. × 8.5" long
Spring 0.08" music wire with 80 Teflon-coated coils with a coil diameter of 3.5"
Torque converter Delrin ® with 8 transfer grooves 9A and a 4.55" O.D.
Drum ABS plastic with 0.4" diameter channel 204. The channel had a .5" lead (i.e., pitch, corresponding to .5" axial travel per rotation) and a 10° conical taper with a starting helical coil diameter of 5". Starting O.D. 5.7", starting I.D. 4.8". Ending O.D. 6.76", ending I.D. 5.86". Length is 3"
Thrust plate Delrin ®, with threads to accept threaded rod.
Threaded Rod (Lead screw)

Teflon ® coated 303 stainless steel. Rolled threads have a .5" lead and 5 starts.
Conventional Slip-ring assembly capable of handling 15 to 20 amps.

---

This assembly was found to be capable of successfully supporting objects 208 within a range of 0.6 ounces to 4 lbs. It was also adjusted and successfully tested with a hairdryer weighing approximately 2 pounds, and found to have a 'drag' of 3 ounces (0.08 kg) or less.

Figure 13:
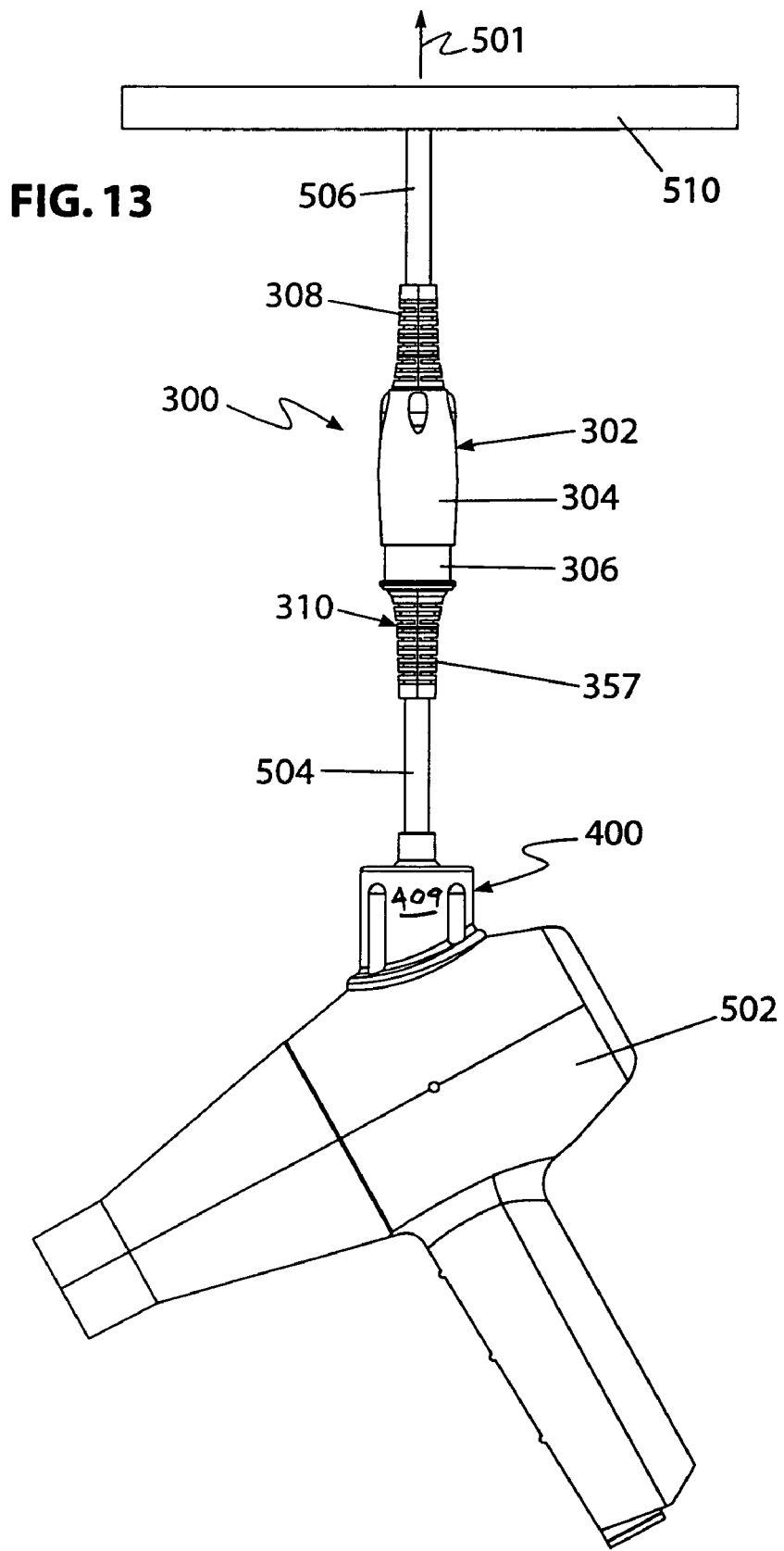
FIG. 13 is a side view of an embodiment of the present invention.
Figure 14:
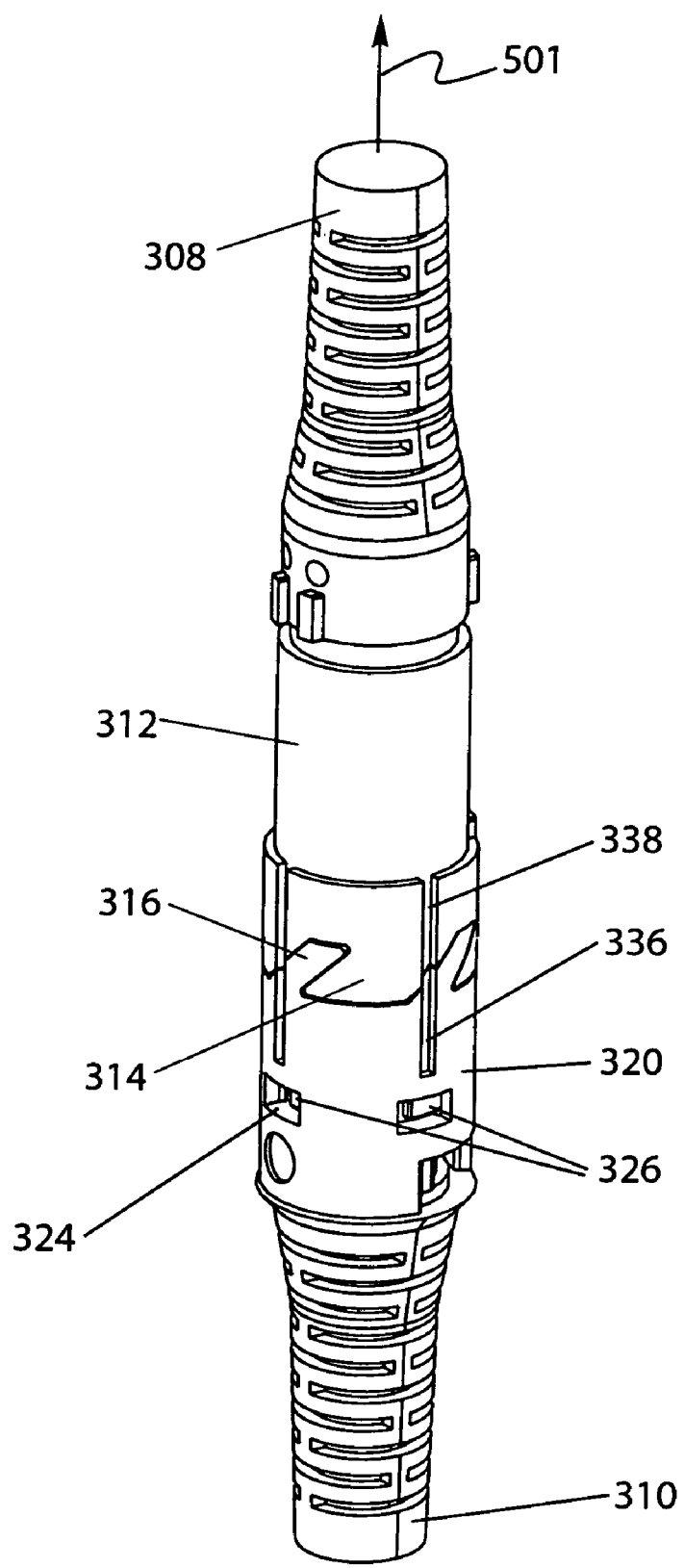
FIG. 14 is a perspective view of the connector assembly of FIG. 13 in a connected state with the shroud portions removed.
Figure 15:
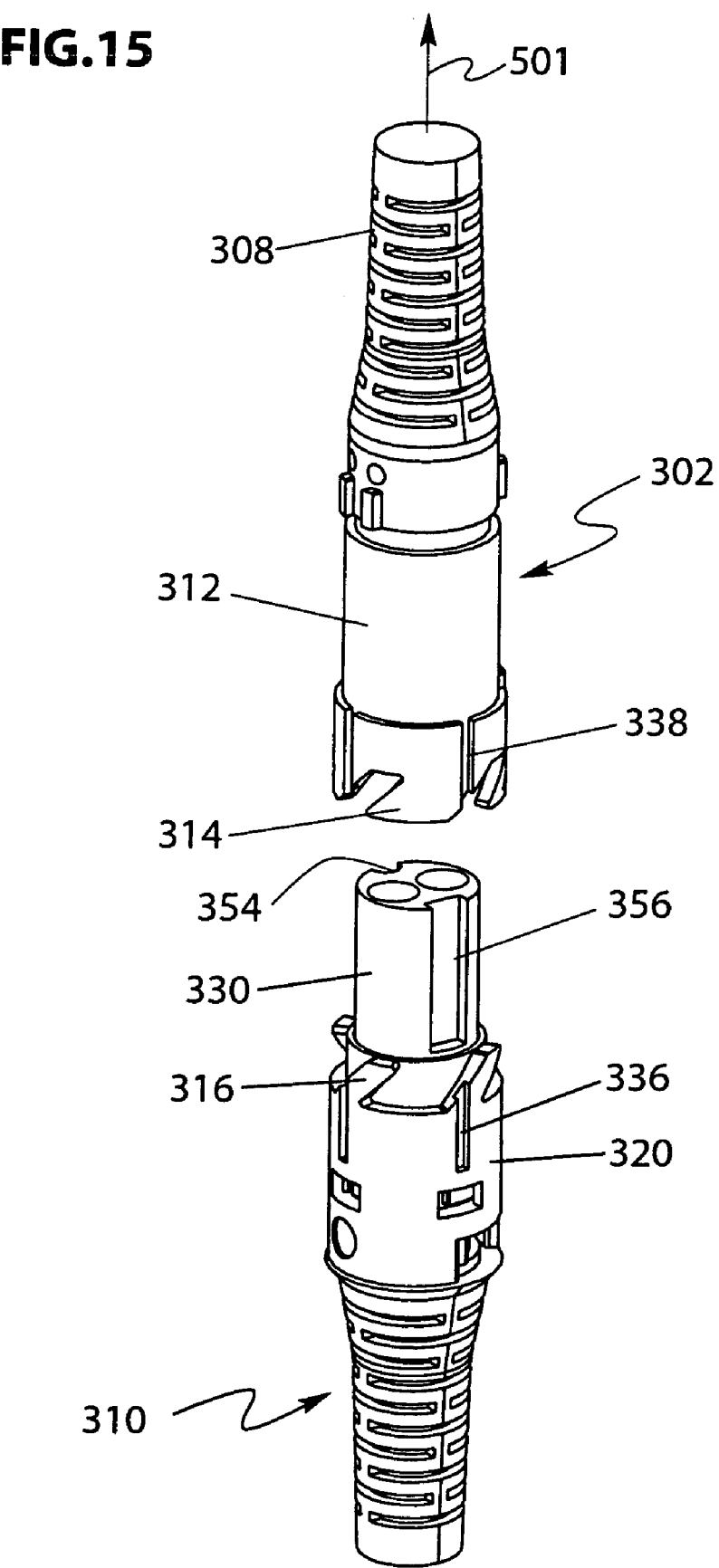
FIG. 15 is a perspective view of a portion of the connector assembly of FIG. 13 in a disconnected state with the shroud portions removed.
Figure 16:
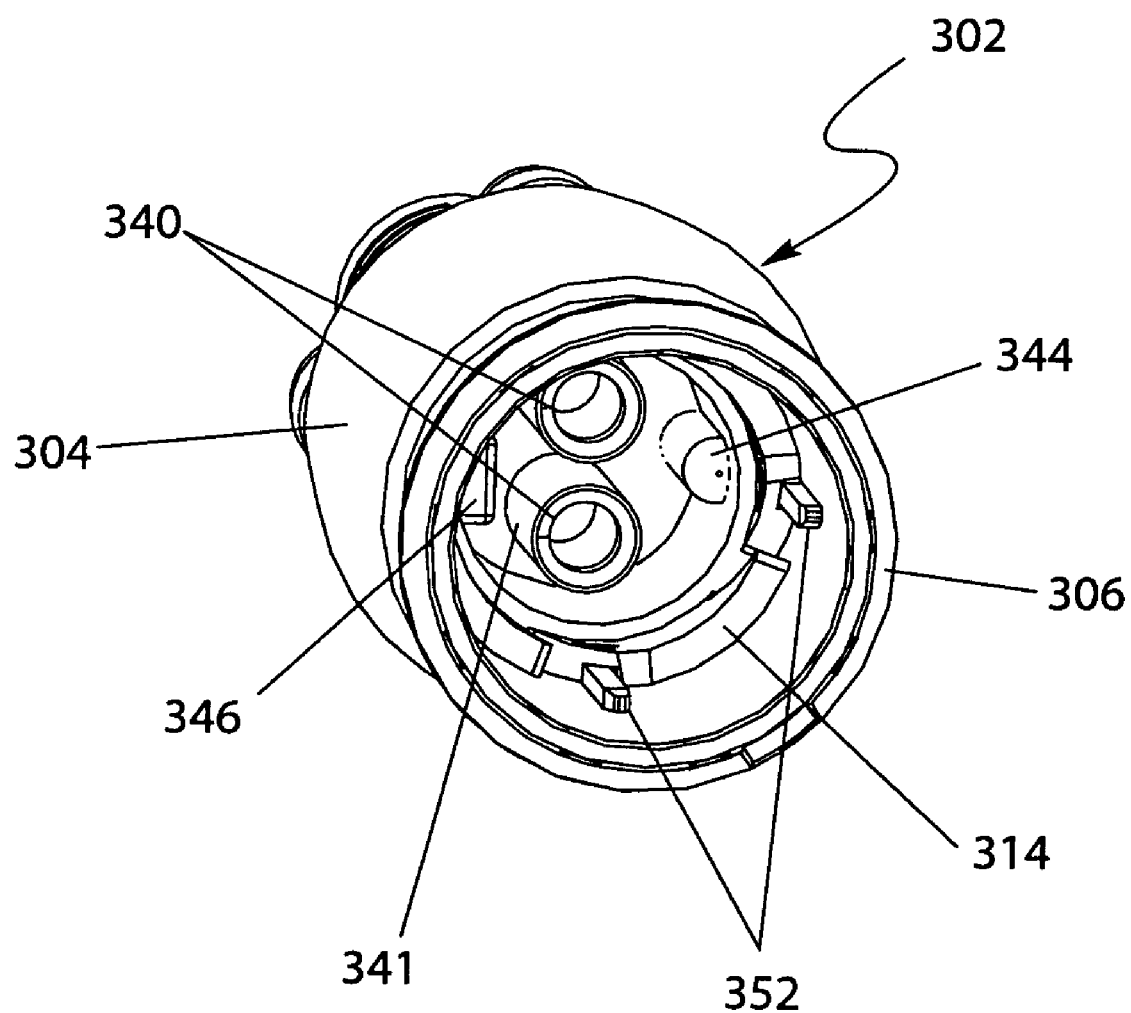
FIG. 16 is a perspective view of an upper portion of the connector assembly of FIG. 13.

With reference now to FIG. 13, one alternative embodiment of a system 500 in accordance with this invention is shown. In this embodiment a tool 502, such as a hair dryer, is shown connected to a support 510, such as suspension system 200 described hereinabove with respect to FIG. 1. System 500 includes a quick release electrical connector 300 for electrically coupling tool 502 to a power source (e.g., located in support 510) through power cords 504 and 506. System 500 further includes a gimbal assembly 400 that enables the tool 502 to rotate substantially freely about first and second perpendicular axes. Connector 300 includes upper 302 and lower 310 connector portions and is described in more detail below with respect to FIGS. 14 through 20. Gimbal assembly 400 is deployed in gimbal housing 410 and is described in more detail below with respect to FIGS. 21 through 23.

It will be understood that the designations of "upper" and "lower" connector portions are for ease of reference only, and are not intended to be limitations on the invention. The artisan of ordinary skill will of course recognize that the electrical connector assembly may be utilized in substantially any orientation, including orientations in which the upper portion 302 is deployed below the lower portion 310. It will further be understood that although the deployments and embodiments described herein are directed to use with a hair dryer, use of connector 300 according to the present invention is not limited to hair dryer applications such as illustrated on FIG. 13. Embodiments of this invention may be useful in a wide range of applications requiring coupling of data and/or power conduits, especially in applications in which a quick release connector capable of supporting axial loads is advantageous. For example, such connectors may be utilized to support substantially any tool, including those used in assembly line applications. Other useful embodiments may provide, for example, a fluid or pneumatic connector rather than an electrical connector as shown in the Figures.

Exemplary connector embodiments according to this invention provide several technical advantages. Various connector embodiments may support axial loads while advantageously maintaining a reliable electrical contact. Moreover, exemplary connector assemblies may be made watertight, e.g., simply by the use of O-rings and may therefore be used in either liquid or gaseous environments. For example, a suitably sized O-ring may be place about each column 341 (FIG. 16), which may then form tight seals between upper and lower portions 302 and 310 upon mutual engagement as discussed below. Various tools (such as hand tools) including electrical connectors according to this invention may thus often exhibit improved reliability. Moreover, it will be appreciated that connecting and disconnecting exemplary connector embodiments of this invention is relatively quick and easy. The use of springs, as described in more detail below (rather than threads or clips as are known in prior art connectors), enables a connection to be made by simply urging the upper 302 and lower 310 portions together. Furthermore, such connector embodiments cannot be partially connected. Rather the connector is either fully connected or fully disconnected, and therefore gives no false sense of being connected. This latter feature makes these embodiments particularly well suited to aircraft and other applications demanding a particularly high level of reliability.

With reference again to FIG. 13, one exemplary embodiment of electrical connector 300 is described in more detail. In the embodiment shown, the upper portion 302 of connector 300 includes first 304 and second 306 substantially cylindrical shrouds that are sized and shaped to cover the internal components of the connector 300. As described in more detail hereinbelow, shroud 304 is deployed to remain substantially stationary with respect to upper portion 302. Shroud 306, on the other hand, is disposed to reciprocate longitudinally along axis 501 and is biased towards the lower portion 310 by an axial spring 356 (shown on FIG. 19A). In the exemplary embodiment shown, shroud 306 includes a plurality of splines 352 (shown on FIG. 16) disposed on an inner surface thereof. With additional reference to FIG. 15, splines 352 engage upper slots 338 formed in an upper lock 312 of upper connector portion 302. Such engagement substantially prevents relative rotation between shroud 306 and lock 312 about axis 501. The artisan of ordinary skill will readily recognize that pins, for example extending through shroud 306, may be substituted for splines 352 without departing from the invention. Moreover, although the splines and slots are shown extending axially, the skilled artisan should recognize that they may be oriented in other directions, e.g., helically, without departing from the spirit and scope of the invention. For example, the splines and slots may form a helix which spirals in a direction opposite that of the teeth to securely maintain engagement thereof. With reference again to FIG. 1, the upper 302 and lower 310 portions may also include reliefs 308 and 357 (typically fabricated from a relatively soft material) that enable the power cords 504 and 506 to flex laterally (i.e., in a direction transverse to axis 501).

Turning now to FIGS. 14 through 17, one exemplary embodiment of connector assembly 300 is shown in connected (FIG. 14) and disconnected (FIGS. 15 through 17) configurations. For clarity, shroud portions 304 and 306 (which prevent connector 300 from unlocking), shown on FIG. 13, are removed on FIGS. 14 and 15. With further reference to FIGS. 19A through 19D, the structure and function of connector assembly 300 will now be described in more detail by describing connection of the upper 302 and lower 310 connector portions. Disconnection of the connector assembly 300 is described in more detail hereinbelow with respect to FIGS. 20A through 20D. Connector assembly 300 may be connected, for example, by simply aligning polarity alignment keyways 354 and 356 with tabs 344 and 346 and then urging upper and lower portions 302 and 310 together along axis 501 as shown at 375 on FIG. 19A. It will be appreciated that in exemplary embodiments in which polarity alignment is advantageous a single keyway and tab may be utilized. It will be understood, however, that this invention is not limited to the use of polarity alignment keyways 354 and 356 and tabs 344 and 346.

Figure 17:
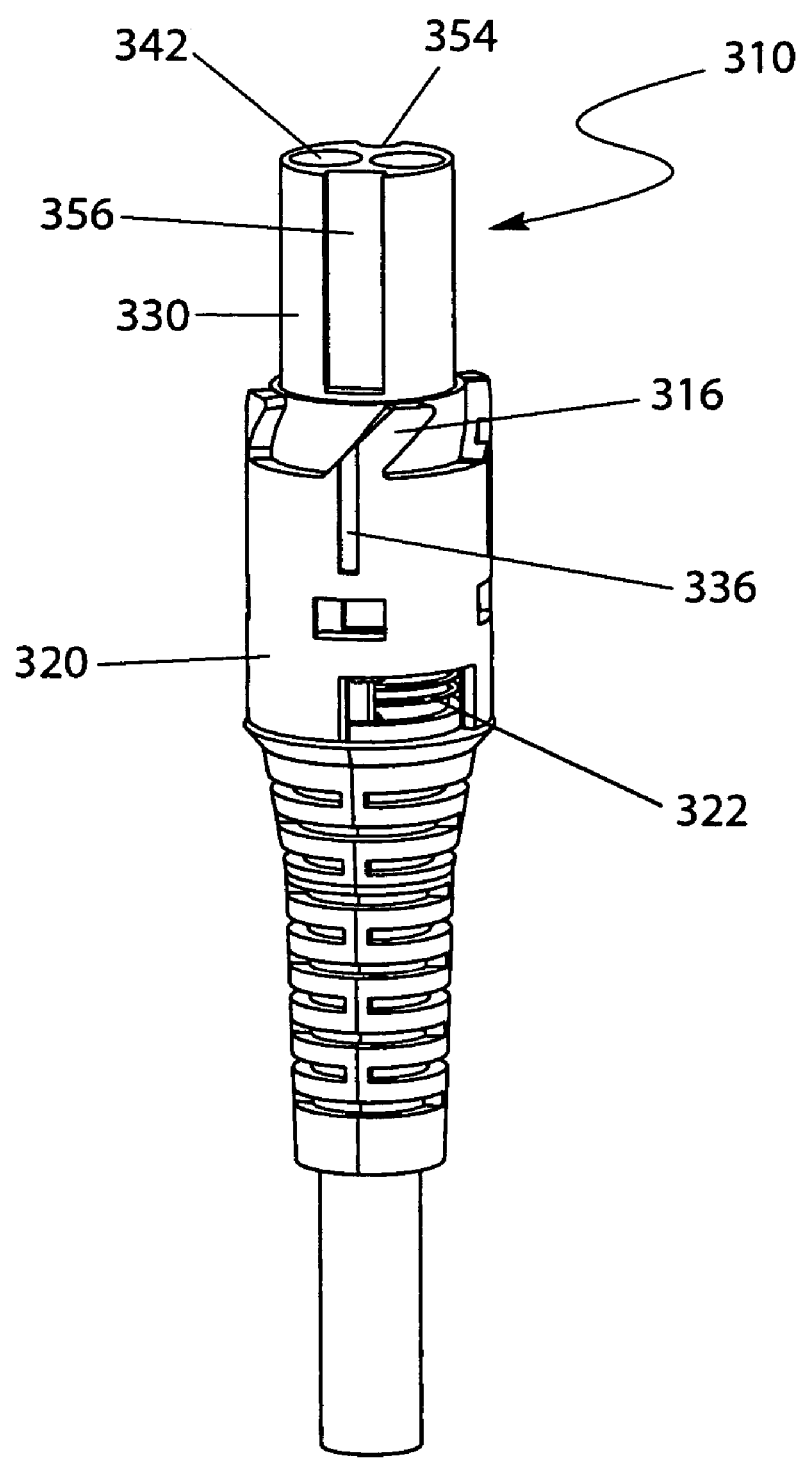
FIG. 17 is a perspective view of a lower portion of the connector assembly of FIG. 13.
Figure 18:
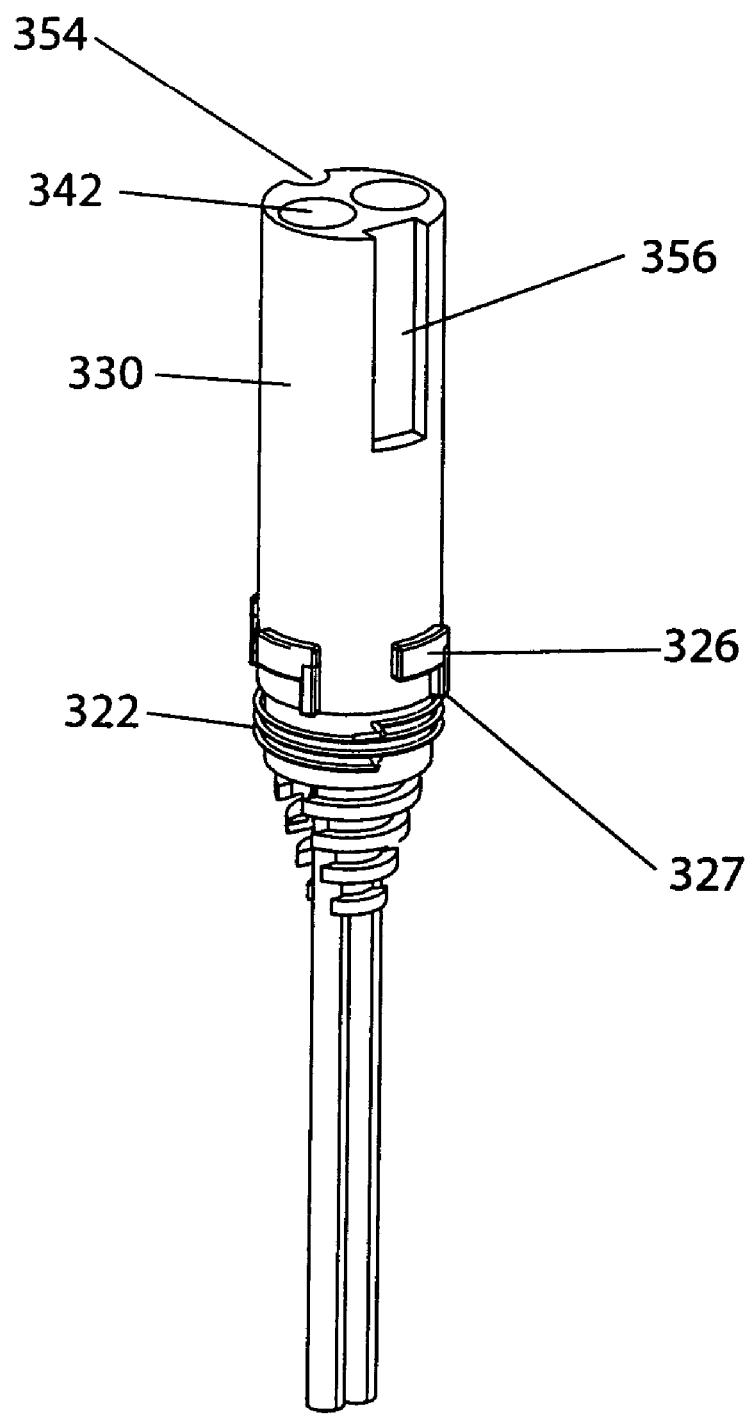
FIG. 18 is a perspective view of an inner component of the lower portion of FIG. 17.

Upper and lower portions 302 and 310 each include a plurality of locking teeth 314 and 316 sized and shaped for engagement with one another. When the upper portion 302 is aligned with and moved into engagement with the lower portion 310 along axis 501 (or likewise when the lower portion 310 is aligned with and moved into engagement with the upper portion 302), locking teeth 316 contact splines 352. Continued axial movement of upper 302 and lower 310 portions into engagement with one another urges shroud 306 upwards against the bias of spring 356 until locking teeth 314 and 316 engage one another enough so splines 352 begin to slide down the shoulder of lock 316 as shown on FIG. 19B and 19C. As shown on FIG. 19C, locking teeth 314 and 316 engage one another to rotationally cam cylindrical lower lock 320 about axis 501 against the bias of torsion spring 322 (FIGS. 17 and 18). Such camming action continues while the upper 302 and lower 310 portions are urged together along axis 501 until the upper teeth 314 and lower teeth 316 are fully engaged in interdigitated orientation with one another as shown on FIGS. 14 and 19D. Upon full engagement the cylindrical upper lock 312 and lower lock 320 are locked one to another and prevented from unlocking by the full engagement of splines 352 with the upper slots 338 and the lower slots 336.

It will be appreciated that embodiments of this invention may include substantially any number of upper 314 and lower teeth 316 having substantially any size relative to the other connector components. The invention is not limited in this regard. The artisan of ordinary skill will also recognize that steep (e.g., multiple start) threads may be used in place of teeth 314 and 316. Such steep threads typically extend at a pitch sufficient to provide full engagement with less than one revolution, and preferably less than one-quarter of one revolution, of upper lock 312 relative to lower lock 320 to promote quick and easy operation.

Figure 19A:
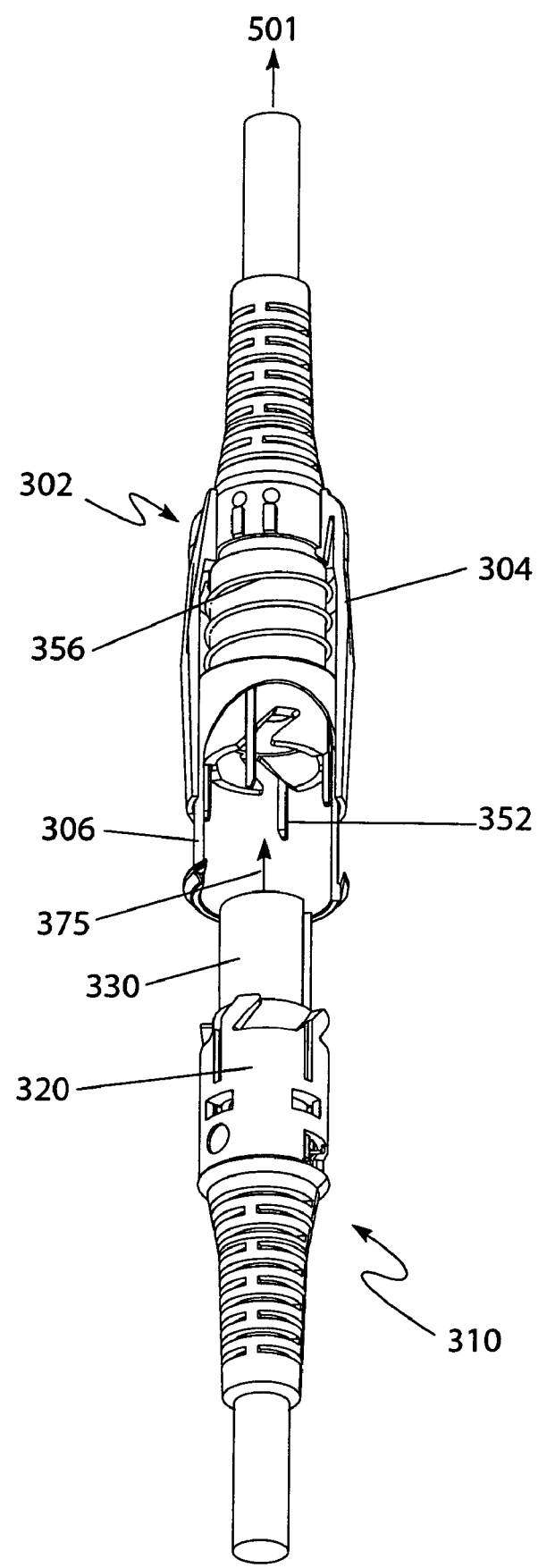
FIGS. 19A through 19D are cut away views illustrating connection of the connector assembly of FIG. 13.
Figure 19B:
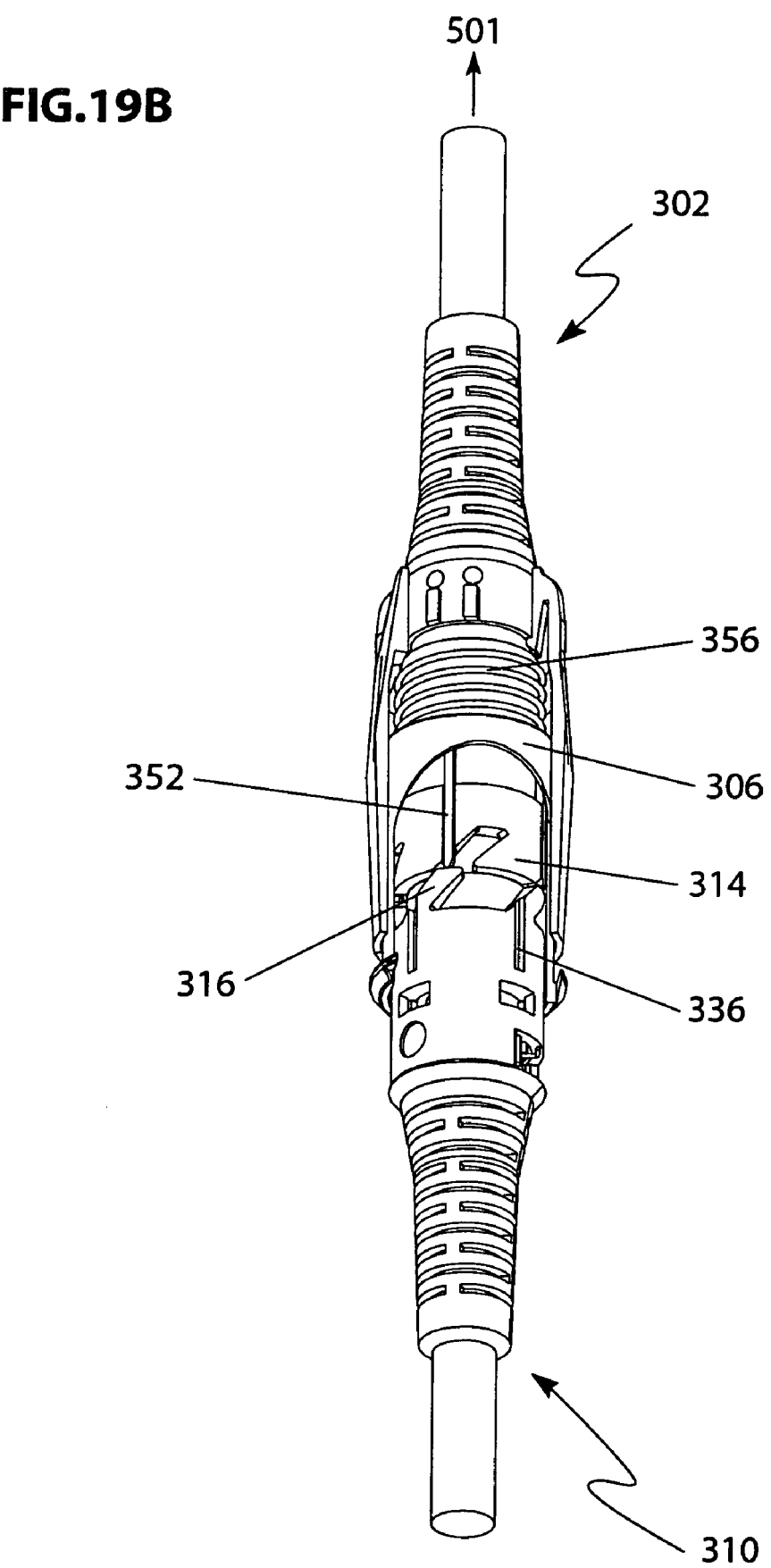
Figure 19C:
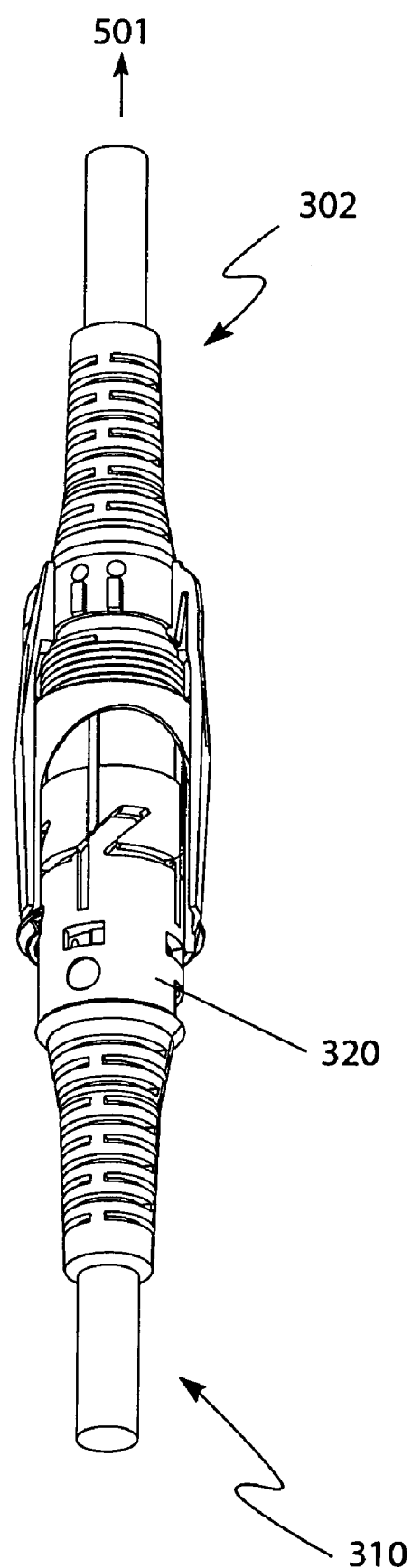
Figure 19D:
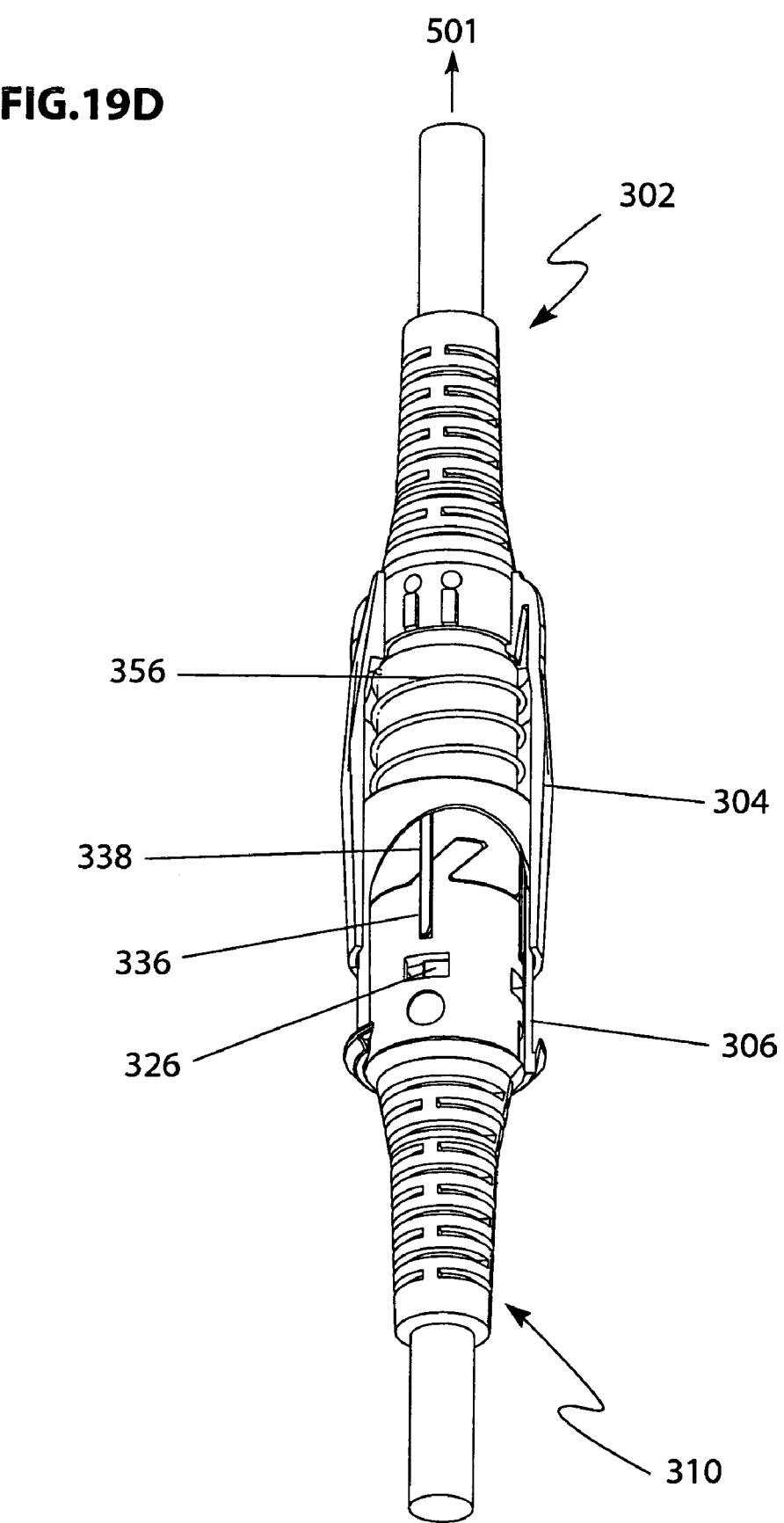
Figure 20A:
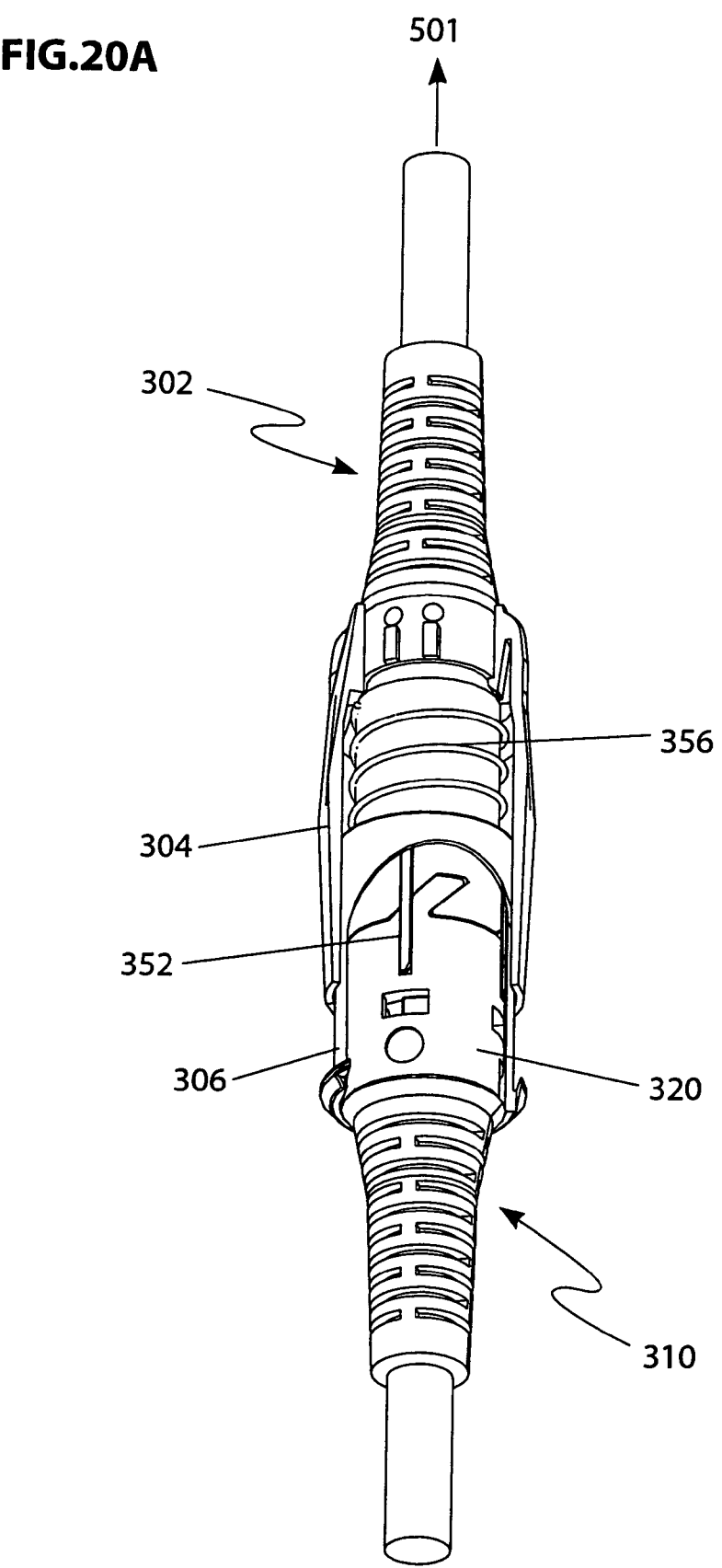
FIGS. 20A through 20D are cut away views illustrating disconnection of the connector assembly of FIG. 13.
Figure 20B:
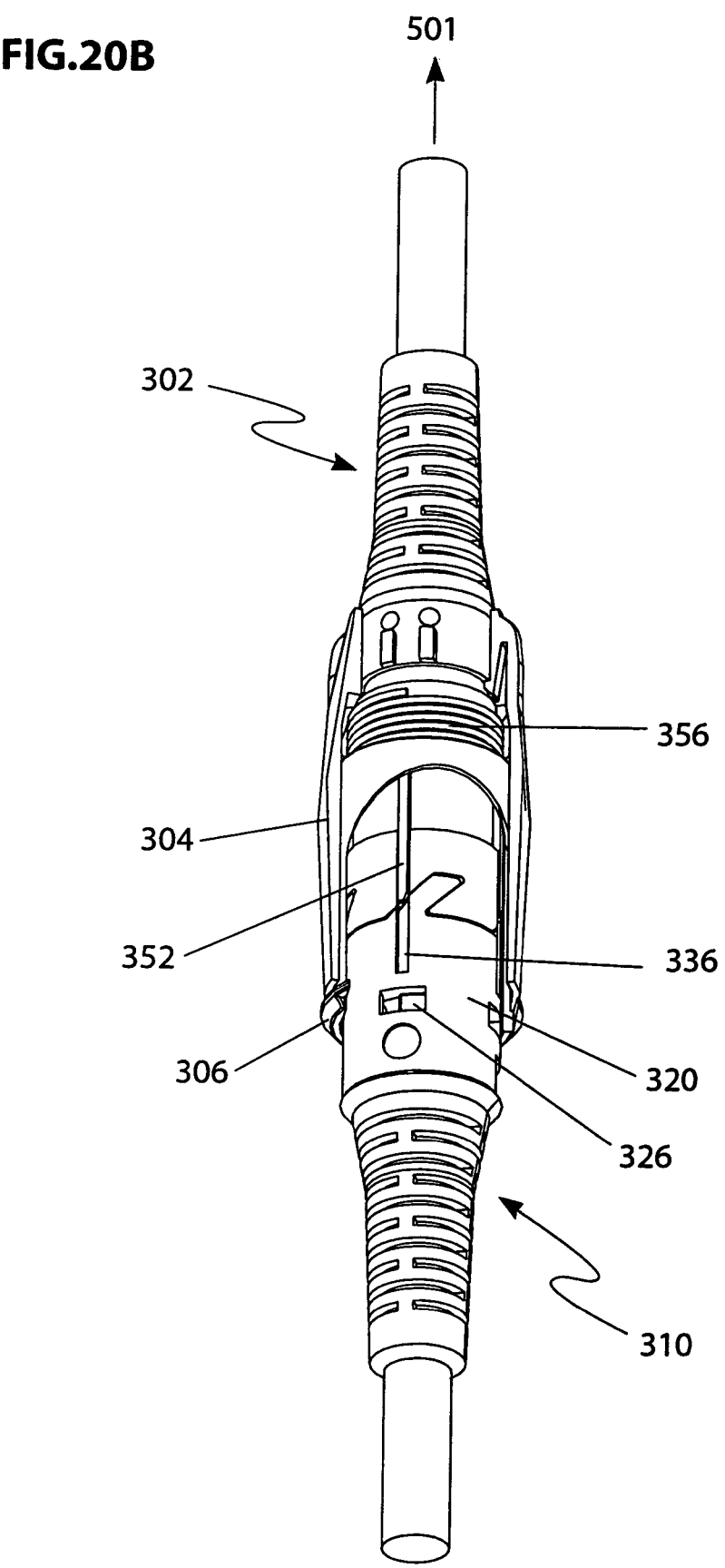
Figure 20C:
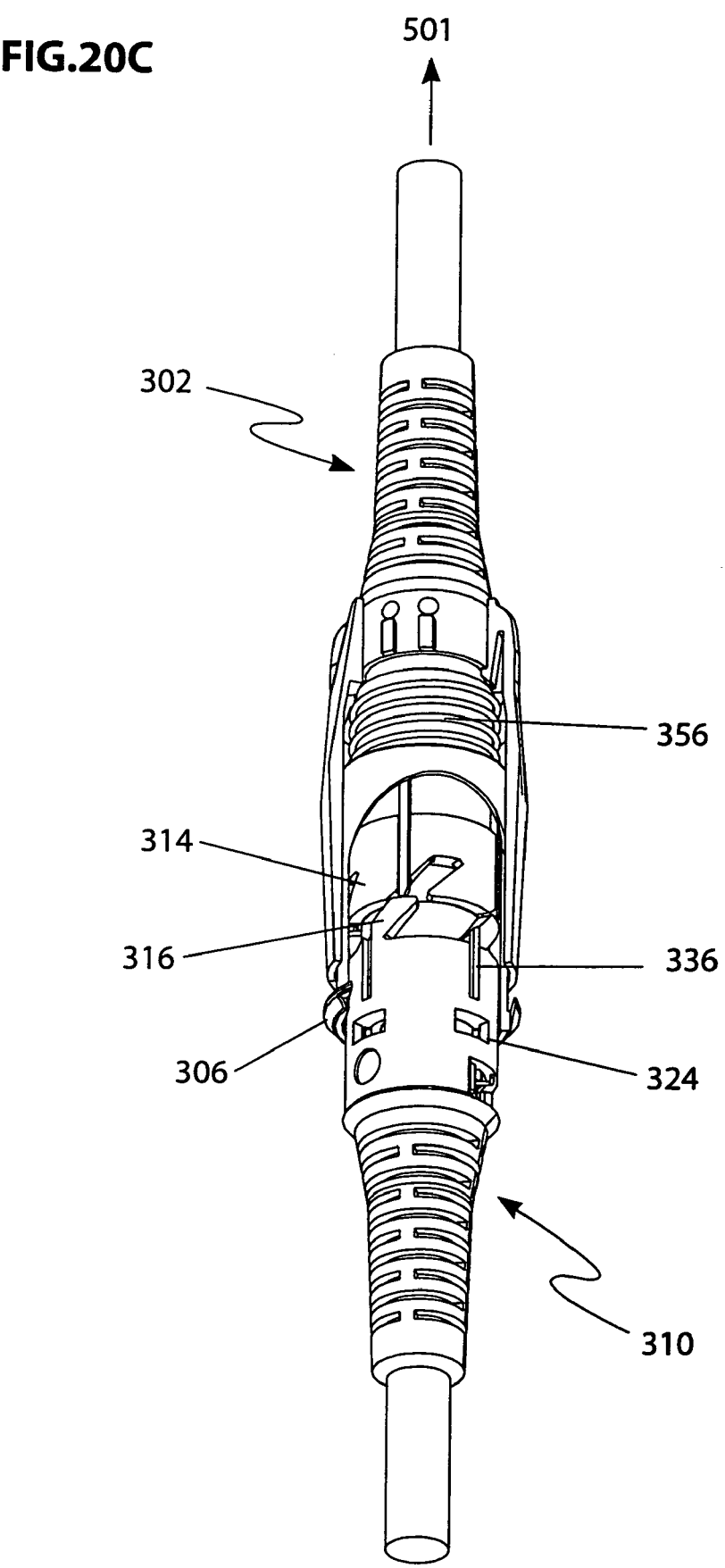
Figure 20D:
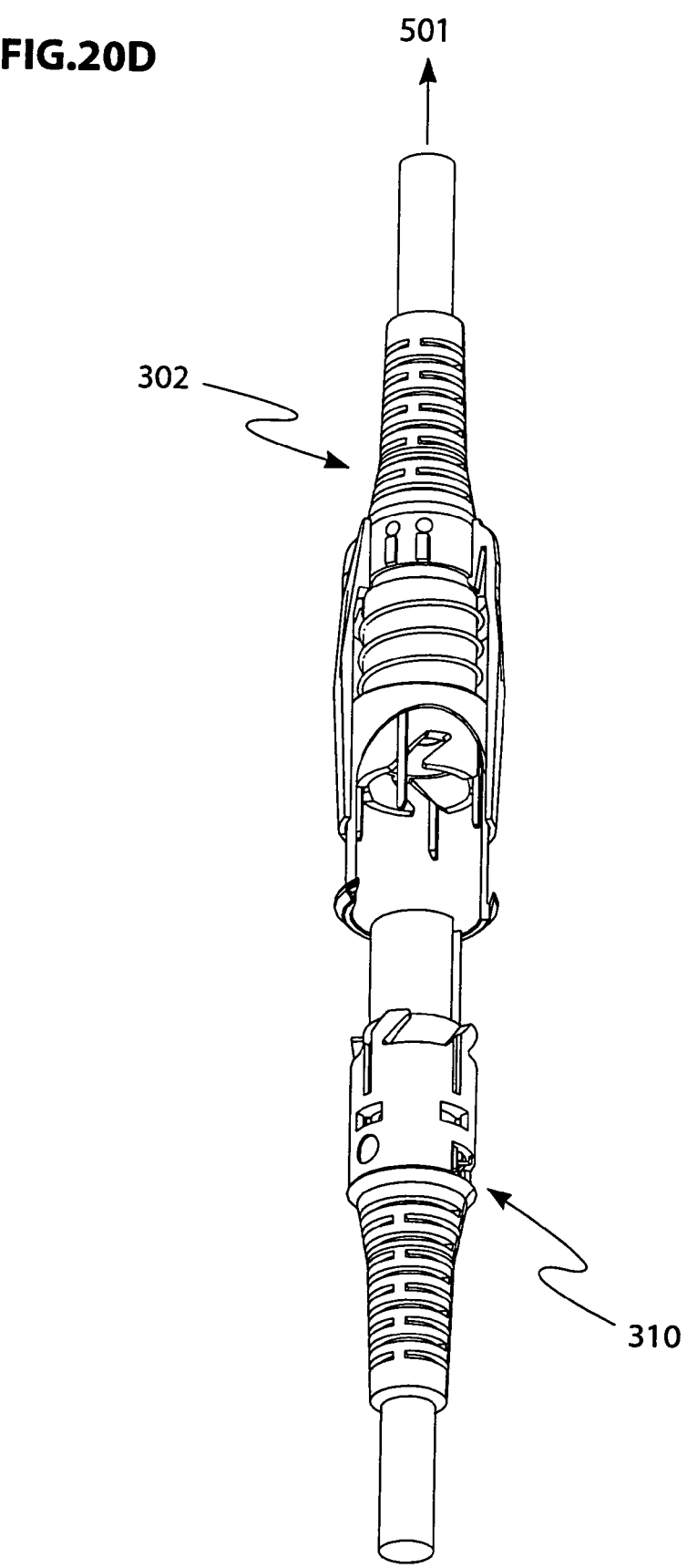

The above described camming action also serves to rotate lower lock 320 about axis 501 such that one or more tabs 324 on lower lock 320 become engaged with abutments 326 and 327 (shown on FIG. 18) deployed on an inner component 330 of lower portion 310. It will be appreciated that lower lock 320 is thus deployed on the inner component 330 in a manner that enables rotation thereof about axis 501 but prevents translation along axis 501 once the upper and lower locks are fully engaged. As shown, the engagement of the tabs 324 and abutments 326 locks or captures the lower lock 320 to inner component 330, thereby inhibiting axial separation upon full engagement of the locks. In this fully engaged position, tabs 324 may also be engaged with abutments 327. Tabs 324 are similarly engaged (albeit on the opposite sides thereof) with abutments 327 when locks 312 and 320 are disengaged, i.e., when lower lock 320 is rotated with the bias of spring 322. In this manner, abutments 327 serve as stops which effectively prevent lower lock 320 from over-rotating in either rotational direction. Moreover, abutments 327 are positioned so that once polarity tabs (e.g., 356 and 346 of FIGS. 16 and 18) are engaged, upper and lower teeth 314 and 316 are properly aligned to facilitate their mutual engagement as shown in FIG. 19B.

Once the upper 314 and lower 316 teeth are fully engaged, slots 336 and 338 are aligned along axis 501. Such alignment enables the lower shroud 306 (FIG. 13) to be biased towards the lower portion 310 of the connector assembly 300 by axial spring 356 such that splines 352 engage slots 336 (as shown on FIG. 19D). The mutual engagement of the splines 352 and aligned slots 336 and 338 substantially prevents lower lock 320 from counter rotating about axis 501, e.g., due to the bias of torsion spring 322 and/or any axial forces on the connector. As such, disengagement of the upper and lower 302 and 310 portions is substantially prevented.

With continued reference to FIGS. 14 through 17, connection of upper portion 302 and lower portion 310 serves to electrically couple male pins (deployed in holes 342 shown on FIGS. 17 and 18) with female receptacles 340 (shown on FIG. 16) and thereby provides electrical communication between hand tool 502 and support 510. In the exemplary embodiment shown, connector assembly 300 is configured to selectively electrically connect and disconnect a hand tool (such as a hair dryer) from a 110 or 220 VAC power source. Moreover, the embodiment shown includes two pins and two corresponding receptacles 340 for coupling "hot" and "neutral" lines of a 110/220 VAC power supply. It will be appreciated that alternative embodiments of connector assembly 300 may include substantially any number and type of pins and sockets, for example for interconnecting a plurality of data and/or power transmission lines, such as, for example, a conventional network bus connector and it is thus not limited to 110/220 VAC. Moreover, as shown, receptacles 340 may be disposed within cylindrical columns 341 sized and shaped for receipt within holes 342. The skilled artisan will recognize that this construction advantageously provides a relatively large degree of insulative separation between adjacent electrical conductors (pins), to help prevent sparks from jumping therebetween. This separation may be useful in achieving certification by various organizations such as Underwriters Laboratories.

With reference now to FIGS. 20A through 20D, disconnection of connector assembly 300 is described in more detail. To disconnect the upper 302 and lower 310 portions of connector assembly 300 a user simply urges shroud 306 upwards against the bias of spring 356, thereby retracting it relative to shroud 304 as shown on FIG. 20B. As also shown on FIG. 20B, such action moves splines 352 clear of lower slots 336 and lower teeth 316, which in turn, allows lower lock 320 to counter rotate under the bias of torsion spring 322 and an axial force exerted by the user or the weight of the tool (FIGS. 17 and 18). The rotation of lower lock 320 enables lower teeth 316 to disengage upper teeth 314. The upper 302 and lower 310 portions may then be separated from one another as shown on FIG. 20D.

It will be appreciated that exemplary embodiments of connector assembly 300 may advantageously support substantial axial loads (such as the weight of hand tool electrically coupled thereto or the force of an operator pulling on the hand tool during use thereof). Referring again to FIGS. 14 through 17, when the upper 302 and lower 310 portions of the connector assembly 300 are connected, such axial loads are supported by the engaged upper 314 and lower 316 teeth. In order to disengage the teeth 314 and 316, one set must be rotated relative to the other (e.g., by rotating lower lock 320 relative to upper lock 312). Such rotation, however, is substantially prevented by the engagement of splines 352 with slots 336 and by the engagement of abutments 326 with lower lock 320 as described above.

It will also be appreciated that exemplary embodiments of connector assembly 300 do not include a partial or intermediate connected state. Rather, the upper 302 and lower 310 portions are advantageously either fully connected or fully disconnected, thereby substantially preventing a user from inadvertently partially connecting the connector, for example, by confusing a false sense of connectedness with an actual physical connection. Such functionality is ensured by the action of springs 322 and 356. Unless the upper 302 and lower 310 portions are fully connected with splines 352 fully engaged with slots 336, torsion spring 322 counter rotates lower lock 320, which disengages upper 314 and lower 316 teeth as described above. Once fully connected, however, axial spring 356 biases splines 352 into engagement with slots 336, thereby ensuring that the connector assembly remains locked in the connected configuration until it is intentionally disconnected.

Figure 21:
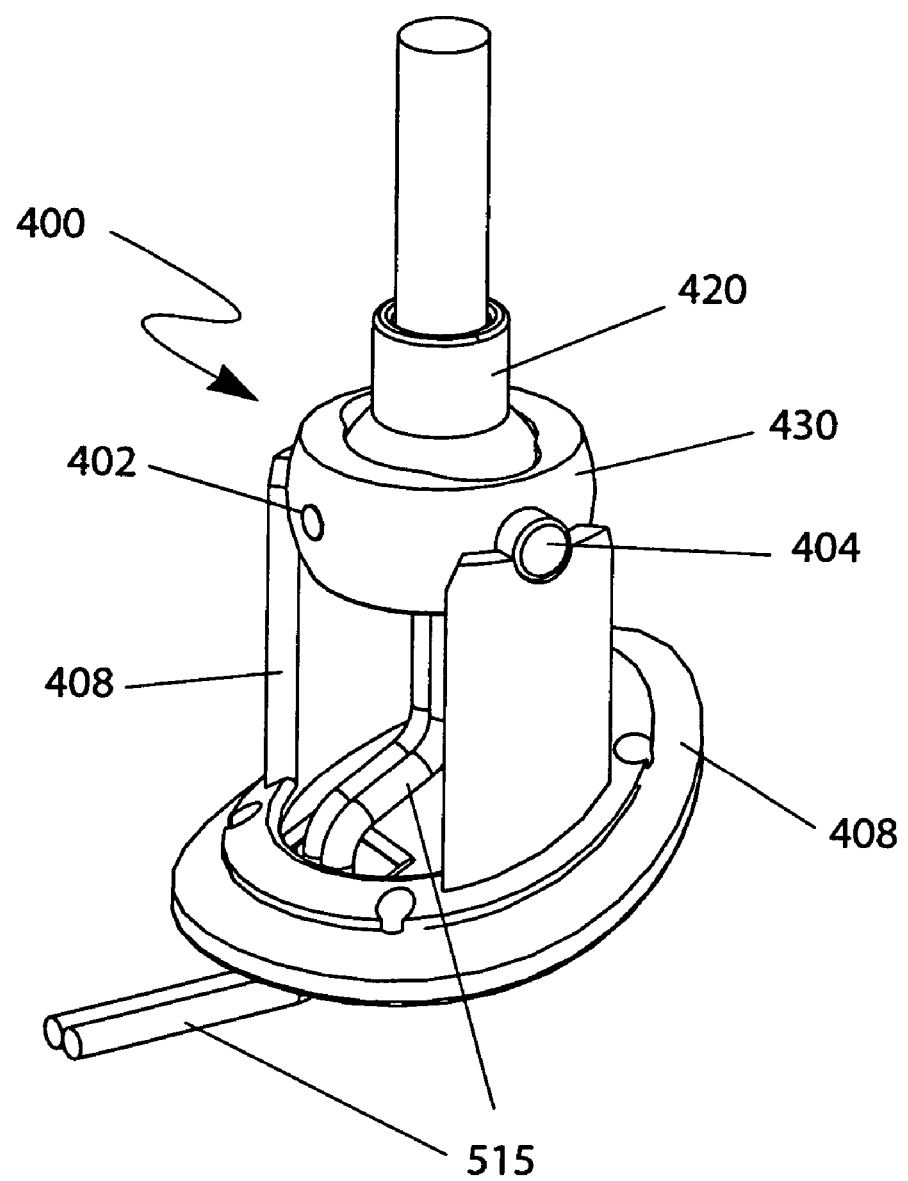
FIG. 21 is a perspective view of the gimbal assembly of FIG. 13 with the outer housing removed.

With reference now to FIG. 21, in which outer housing 410 has been removed for clarity, one exemplary embodiment of gimbal assembly 400 (FIG. 13) is described in more detail. Gimbal assembly 400 includes a gimbal 430 deployed about a receptacle, which in the embodiment shown is in the form of a substantially spherical ball 420, which may optionally, as shown, include an elongated neck portion through which cord 504 (FIG. 13) may extend. Gimbal 430 is disposed to rotate about receptacle 420 and a first axle 402, which extends through receptacle 420. The receptacle 420 and gimbal 430 are disposed to rotate together about a second axle 404, which is supported by, and captured between, an internal housing 408 and an external housing 409 (FIG. 13) engaged therewith. Housings 408 and 409 are typically mechanically coupled (e.g., screwed or riveted) to one another and/or to hand tool 502 (FIG. 13).

Figure 22:
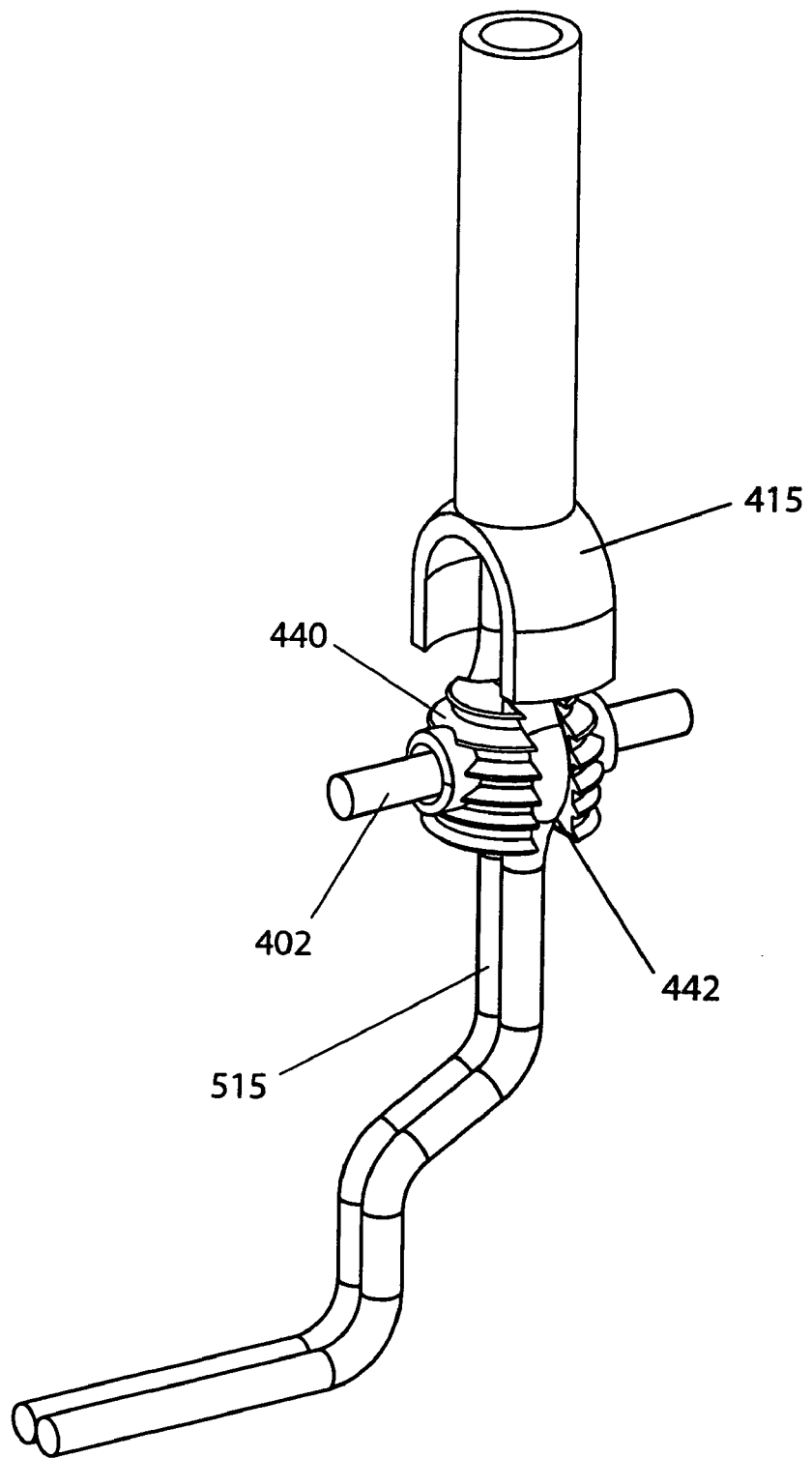
FIG. 22 is a partially exploded view of an interior portion of the gimbal assembly of FIG. 13.
Figure 23:
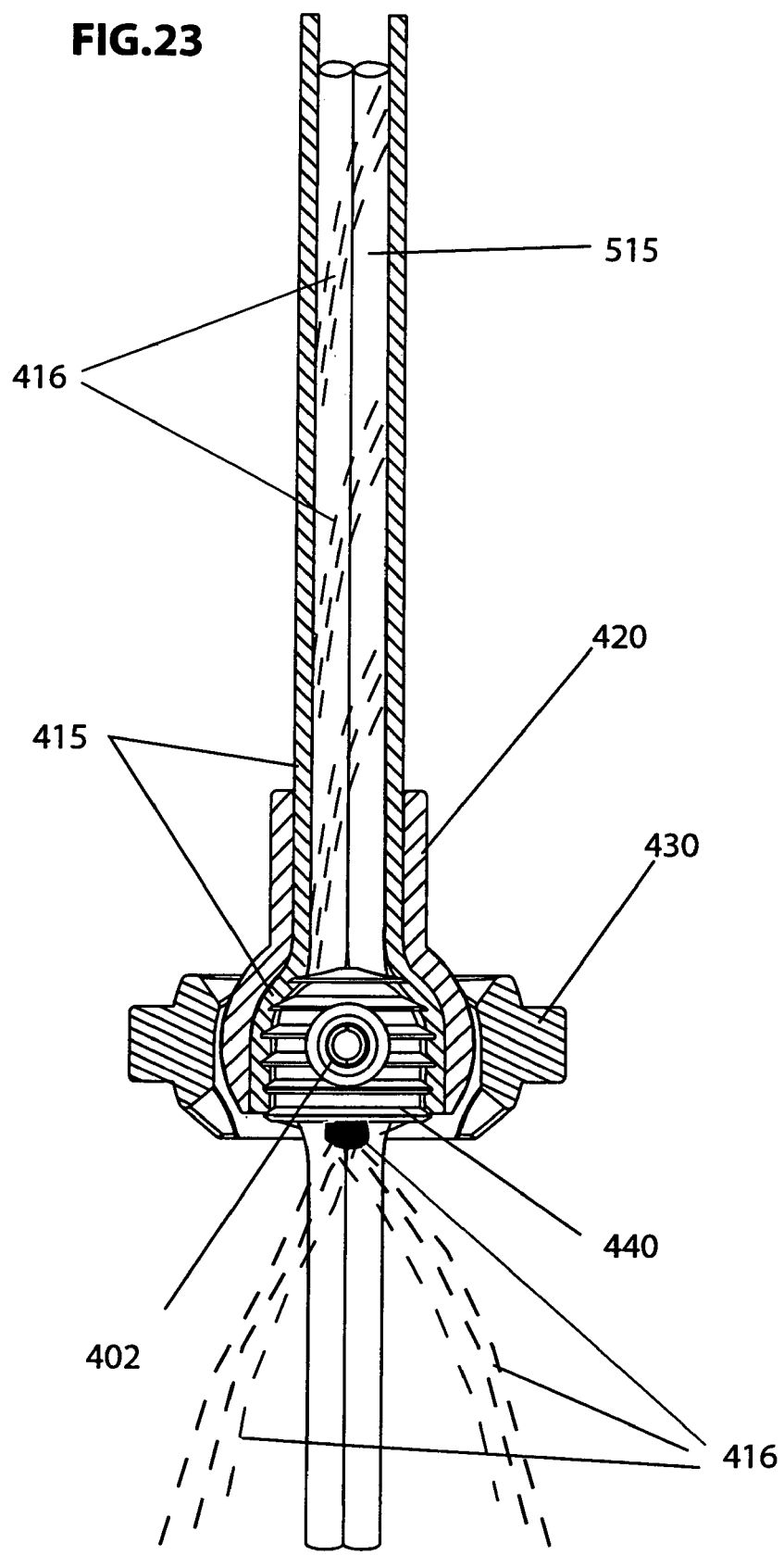
FIG. 23 is a cross sectional view of the gimbal assembly of FIG. 13.

With reference now to FIGS. 22 and 23, and continued reference to FIG. 21, electrical wires 515 extend through the gimbal assembly, for example from hand tool 502 to a power source located in support 510 (FIG. 13). Electrical wires 515 are tightly secured in wire channels 442 of internal wedge 440 to substantially prevent the electrical wires 515 from being pulled through the gimbal assembly 400 along axis 501. As shown on FIG. 22, electrical wires 515 straddle or otherwise bypass first axle 402, which extends through the inner wedge 440. Cable jacket 415 is deployed about internal wedge 440 and protects electrical wires 515 from mechanical damage. In one suitable embodiment, cable jacket 415 includes a high strength fiber material 416 such as a Kevlar® aramid fiber (E.I. du Pont de Nemours and Company, Wilmington, Del.). Such fibers 416 may extend along the longitudinal axis of the jacket 415, e.g.,in a direction substantially parallel or helical relative to conductors 515. In one optional embodiment, the fibers 416 are tied together below axle 402 and provide additional axial strength to the gimbal assembly 400. As shown on FIG. 23, receptacle 420 may be press fit about cable jacket 415, causing rib portions 444 of internal wedge 440 to securely engage an internal surface of the cable jacket 415, e.g., by slight penetration therein. Such engagement of rib portions 444 with cable jacket 415 secures the electrical wires 515 in the gimbal assembly and substantially prevents them from being pulled therethrough. It will be appreciated that in alternative embodiments wires 515 and jacket 415 may be molded into the spherical receptacle 420 using techniques such as injection molding and/or casting molding. It will also be appreciated that while gimbal assembly 400 is shown in use with a handheld tool such as hair dryer 502 (FIG. 13), exemplary embodiments of gimbal assembly 400 may advantageously support axial loads in excess of 100 pounds (45 kilograms).

Although the connector and gimble embodiments have been described herein as being electrical devices, it should be recognized by those skilled in the art that they may be adapted to non-electrical uses, such as, for example, air or gas lines, without departing from the spirit and scope of the present invention. Moreover, the connector and/or gimble embodiments may be used in substantially any application in which quick and accurate connection of two components is required.

Furthermore, although the embodiments shown and describe relate to in-line connectors, the skilled artisan should recognize that these embodiments may be adapted to panel-mounted applications while remaining within the scope of this invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A multi-elevational tool support comprising:
   a drum disposed to rotate about a central axis;
   a spring disposed to bias rotation of the drum;
   a cord coupled at a proximal end thereof to the drum;
   a tool coupled to a distal end of the cord;
   the cord configured to supply power to the tool;
   a quick release electrical connector deployed between and configured to selectively electrically connect and disconnect the proximal and the distal ends of the cord;
   the drum configured to windingly receive the cord thereabout;
   the cord configured for being alternately wound and unwound with and against the bias of the spring as the tool is respectively raised and lowered;
   the drum configured for moving axially during the alternate winding and unwinding;
   an axially stationary entry and exit point through which the cord alternately disengages and engages the drum during the alternate unwinding and winding;
   the spring being coupled to the drum; and
   the spring being configured for remaining axially stationary during the axial movement of the drum.

2. The multi-elevational tool support of claim 1, wherein the electrical connector is configured to support an axial load along a longitudinal axis of the cord.

3. The multi-elevational tool support of claim 1, wherein the electrical connector is configured to selectively electrically connect and disconnect the tool from a power supply.

4. The multi-elevational tool support of claim 1, wherein the electrical connector further comprises:
   one or more first electrical contacts deployed on a first portion of the electrical connector;
   one or more second electrical contacts deployed on a second portion of the electrical connector; and the first portion configured to engage and disengage with the second portion wherein the one or more first electrical contacts electrically couples and decouples with corresponding ones of the one or more second plurality of contacts upon connecting and disconnecting of the electrical connector.

5. The multi-elevational tool support of claim 1, wherein the electrical connector further comprises:
a first plurality of teeth disposed on a first portion of the electrical connector;
a second plurality of teeth disposed on a second portion of the electrical connector; and
the first and second pluralities of teeth configured to selectively engage and disengage one another upon connecting and disconnecting the electrical connector, said engagement of the teeth operative to substantially prevent relative axial motion between the first and second portions of the electrical connector.

6. The multi-elevational tool support of claim 1, wherein the electrical connector further comprises:
a first lock deployed on a first portion;
a second lock deployed on a second portion, the second lock configured to rotate about a longitudinal axis of the second portion between first and second rotational positions, the second lock biased towards the first rotational position, the second lock in the second rotational position when the electrical connector is connected; and
the first and second locks configured to engage and disengage one another upon connecting and disconnecting of the electrical connector, said engagement of the first and second locks operative to substantially prevent relative axial motion between the first and second portions of the electrical connector.

7. The multi-elevational tool support of claim 6, wherein the electrical connector further comprises:
a shroud deployed on the first portion substantially coaxially about the first lock, the shroud disposed to displace along a longitudinal axis of the first portion between first and second shroud positions, the shroud biased towards the first shroud position, the shroud in the first shroud position when the electrical connector is connected; and
the shroud substantially preventing the second lock from rotating from the second rotational position to the first rotational position when the electrical connector is connected.

8. The multi-elevational tool support of claim 7, wherein the electrical connector further comprises an axial spring deployed about the first lock, the axial spring disposed to bias the shroud towards the first shroud position.

9. The connector of claim 8, wherein the splines and slots extend substantially parallel to the longitudinal axis of the first portion.

10. The multi-elevational tool support of claim 7, wherein the shroud includes one or more splines disposed on an inner surface thereof, the splines respectively engaged with one or more slots formed in an outer surface of the first lock.

11. The multi-elevational tool support of claim 10, wherein:
the second lock includes a plurality of slots formed in an outer surface thereof;
the slots in the second lock are substantially aligned with the slots in the first lock when the second lock is in the second rotational position; and
the splines are engaged with the slots in the second lock when the electrical connector is connected, said engagement of the splines with the slots in the second lock operative to prevent the second lock from rotating with its bias to the first rotational position.

12. The multi-elevational tool support of claim 7, wherein:
the first lock includes a first plurality of teeth and a first plurality of slots;
the second lock includes a second plurality of teeth and a second plurality of slots;
the shroud includes a plurality of splines disposed on a surface thereof;
the first and second pluralities of teeth configured to selectively engage and disengage one another upon connecting and disconnecting the electrical connector, said engagement of the teeth operative to substantially prevent relative axial motion between the first and second portions of the electrical connector;
the second plurality of slots substantially aligned with the first plurality of slots when the second lock is in the second rotational position; and
the splines engaged with the first and the second plurality of slots when the electrical connector is connected, said engagement of the splines with the second plurality of slots operative to prevent the second lock from rotating with its bias to the first rotational position.

13. The multi-elevational tool support of claim 12, wherein said engagement of the teeth is operative to rotationally cam the second lock against its bias from the first rotational position to the second rotational position.

14. The multi-elevational tool support of claim 6, wherein:
the first lock includes a first plurality of teeth;
the second lock includes a second plurality of teeth; and
the first and second pluralities of teeth are configured to selectively engage and disengage one another upon connecting and disconnecting the electrical connector, said engagement of the teeth operative to substantially prevent relative axial motion between the first and second portions of the electrical connector.

15. The multi-elevational tool support of claim 6, wherein the electrical connector further comprises a torsion spring deployed between the second portion and the second lock, the torsion spring disposed to bias the second lock towards the first rotational position.

16. The multi-elevational tool support of claim 6, wherein the second lock includes a plurality tabs disposed on an inner surface thereof, the tabs configured to engage a corresponding plurality of abutment members deployed on an inner component of the second portion when the second lock is in the second rotational position, to effectively capture the second lock onto the inner component.

17. The multi-elevational tool support of claim 6, wherein the second lock is configured to rotate about the longitudinal axis one revolution or less between the first and second rotational positions.

18. The multi-elevational tool support of claim 1, further comprising:
a gimbal assembly deployed between the electrical connector and the distal end of the cord, the cord extending through the gimbal assembly, the gimbal assembly configured to permit rotation of the tool about first and second axes.

19. The multi-elevational tool support of claim 18, wherein the cord extends through the gimbal assembly in a direction substantially orthogonal to the first and second axes.

20. The multi-elevational tool support of claim 18, wherein the gimbal assembly is coupled to the tool.

21. The multi-elevational tool support of claim 18, wherein the gimbal assembly substantially prevents the cord from being pulled therethrough.

22. The multi-elevational tool support of claim 18, wherein the cord comprises first and second electric lines, the first and second electric lines straddling a first axle in the gimbal assembly.

23. The multi-elevational tool support of claim 22, wherein the gimbal assembly further comprises:
   a gimbal deployed about a receptacle, the gimbal disposed to rotate about the first axle, the first axle extending through the gimbal and the receptacle;
   the gimbal including a second axle, the gimbal and receptacle disposed to rotate together about the second axle, the second axle substantially orthogonal to the first axle, the second axle supported by a housing;
   a wedge deployed in the receptacle, the wedge including first and second wire channels, the first and second wire channels disposed to receive the corresponding first and second electric lines; and
   a cable jacket deployed about the wedge, the cable jacket disposed to secure the first and second electric lines in the first and second wire channels.

24. A multi-elevational tool support comprising:
   a drum disposed to rotate about a central axis;
   a spring disposed to bias rotation of the drum;
   a cord coupled at a proximal end thereof to the drum;
   a tool coupled to a distal end of the cord;
   the cord configured to supply power to the tool;
   a gimbal assembly deployed between the proximal and the distal ends of the cord, the cord extending through the gimbal assembly, the gimbal assembly configured to permit rotation of the tool about first and second axes;
   the drum configured to windingly receive the cord thereabout;
   the cord configured for being alternately wound and unwound with and against the bias of the spring as the tool is respectively raised and lowered;
   the drum configured for moving axially during the alternate winding and unwinding;
   an axially stationary entry and exit point through which the cord alternately disengages and engages the drum during the alternate unwinding and winding;
   the spring being coupled to the drum; and
   the spring being configured for remaining axially stationary during the axial movement of the drum.

25. The multi-elevational tool support of claim 24, wherein the cord extends through the gimbal assembly in a direction substantially orthogonal to the first and second axes.

26. The multi-elevational tool support of claim 24, wherein the cord comprises first and second electric lines, the first and second electric lines disposed to bypass a first axle in the gimbal assembly.

27. The multi-elevational tool support of claim 24, wherein the gimbal assembly comprises:
   a gimbal deployed about a receptacle, the gimbal disposed to rotate about a first axle, the first axle extending through the gimbal and the receptacle; and
   the gimbal including a second axle, the gimbal and the receptacle disposed to rotate together about the second axle, the second axle substantially orthogonal to the first axle, the second axle supported by an internal housing.

28. The multi-elevational tool support of claim 27 wherein the cord comprises first and second electric lines and wherein the gimbal assembly further comprises:
   a wedge deployed in the receptacle, the wedge including one or more wire channels disposed to receive corresponding one or more electric lines; and
   a cable jacket deployed about the wedge, wherein the cable jacket is secured between the receptacle and the wedge to resist axial movement of the cable.

29. The gimbal assembly of claim 28, wherein the wedge comprises at least one protruding rib portion on an external surface thereof, the rib portion engaging an inner surface of the cable jacket.

30. The gimbal assembly of claim 29, wherein said engagement of the at least one rib portion into the cable jacket substantially prevents the cord from being pulled through the gimbal assembly.

31. A multi-elevational tool support comprising:
   a drum disposed to rotate about a central axis;
   a spring disposed to bias rotation of the drum;
   a cord coupled at a proximal end thereof to the drum;
   a tool coupled to a distal end of the cord;
   the cord configured to supply power to the tool;
   a quick release electrical connector deployed between and configured to selectively electrically connect and disconnect the proximal and the distal ends of the cord;
   a gimbal assembly deployed between the electrical connector and the distal end of the cord, the cord extending through the gimbal assembly, the gimbal assembly configured to permit rotation of the tool about first and second axes;
   the drum configured to windingly receive the cord thereabout;
   the cord configured for being alternately wound and unwound with and against the bias of the spring as the tool is respectively raised and lowered;
   the drum configured for moving axially during the alternate winding and unwinding;
   an axially stationary entry and exit point through which the cord alternately disengages and engages the drum during the alternate unwinding and winding;
   the spring being coupled to the drum; and
   the spring being configured for remaining axially stationary during the axial movement of the drum.

32. A multi-elevational tool support comprising:
   a drum disposed to rotate about a central axis;
   a spring disposed to bias rotation of the drum;
   a power cord having first and second ends, the first end coupled to the drum, the second end coupleable to a tool;
   the drum configured to windingly receive the cord thereabout;
   the cord configured for being alternately wound and unwound with and against the bias of the spring as the tool is respectively raised and lowered;
   a quick release electrical connector deployed between the first and second ends of the cord, the electrical connector configured to selectively electrically connect and disconnect the first and second ends of the cord;
   the electrical connector including a first lock deployed on a first portion;
   the electrical connector further including a second lock deployed on a second portion, the second lock configured to rotate about a longitudinal axis of the second portion between first and second rotational positions, the second lock biased towards the first rotational position, the second lock in the second rotational position when the electrical connector is connected; and the first and second locks configured to engage and disengage one another upon connecting and disconnecting of the electrical connector, said engagement of the first and second locks operative to substantially prevent relative axial motion between the first and second portions of the electrical connector.

33. The multi-elevational tool support of claim 32, further comprising:

a gimbal assembly deployed between the electrical connector and the second end of the cord, the cord extending through the gimbal assembly, the gimbal assembly configured to permit rotation of the tool about first and second axes.

34. The multi-elevational tool support of claim 33, wherein the electrical connector further comprises:

a shroud deployed on the first portion substantially coaxially about the first lock, the shroud disposed to displace along a longitudinal axis of the first portion between first and second shroud positions, the shroud biased towards the first shroud position, the shroud in the first shroud position when the electrical connector is connected; and the shroud substantially preventing the second lock from rotating from the second rotational position to the first rotational position when the electrical connector is connected.

35. The multi-elevational tool support of claim 34, wherein the shroud includes a plurality of splines disposed on a surface thereof, the splines engaged with a corresponding plurality of slots formed in an outer surface of the first lock, the splines and slots substantially parallel to the longitudinal axis of the first portion.

36. The multi-elevational tool support of claim 35, wherein:

the second lock includes a plurality of slots formed in a surface thereof;

the slots in the second lock substantially aligned with the slots in the first lock when the second lock is in the second rotational position; and the splines engaged with the slots in the second lock when the electrical connector is connected, said engagement of the splines with the slots in the second lock operative to prevent the second lock from rotating with its bias to the first rotational position.

37. The multi-elevational tool support of claim 32, wherein:

the first lock includes a first plurality of teeth;

the second lock includes a second plurality of teeth; and the first and second pluralities of teeth are configured to selectively engage and disengage one another upon connecting and disconnecting the connector, said engagement of the teeth operative to substantially prevent relative axial motion between the first and second portions of the connector.

38. A multi-elevational tool support comprising:

a drum disposed to rotate about a central axis;

a spring disposed to bias rotation of the drum;

a power cord having first and second ends, the first end coupled to the drum, the second end coupleable to a tool, the power cord further including first and second electric lines;

the drum configured to windingly receive the cord thereabout;

the cord configured for being alternately wound and unwound with and against the bias of the spring as the tool is respectively raised and lowered;

a gimbal assembly deployed between the first and second ends of the cord, the cord extending through the gimbal assembly, the gimbal assembly configured to permit rotation of the tool about first and second axles; and the gimbal assembly including a wedge deployed in a receptacle, the wedge including first and second wire channels, the first and second wire channels disposed to receive the corresponding first and second electric lines wherein the first and second electric lines bypass a first axle.

39. The multi-elevational tool support of claim 38, further comprising a quick release electrical connector deployed between the first end of the cord and the gimbal assembly, the electrical connector configured to selectively electrically connect and disconnect the first and second ends of the cord.

40. The multi-elevational tool support of claim 38, wherein the gimbal assembly further comprises:

a gimbal deployed about the receptacle, the gimbal disposed to rotate about the first axle, the first axle extending through the gimbal and the receptacle; and the gimbal including a second axle, the gimbal and the receptacle disposed to rotate together about the second axle, the second axle substantially orthogonal to the first axle, the second axle supported by an internal housing.

41. The multi-elevational tool support of claim 38 wherein the gimbal assembly further comprises a cable jacket deployed about the wedge, wherein the cable jacket is secured between the receptacle and the wedge to resist axial movement of the cable.

42. The multi-elevational tool support of claim 41, wherein:

the wedge of the gimbal assembly comprises at least one protruding rib portion on an external surface thereof, the rib portion penetrating an inner surface of the cable jacket; and said penetration of the at least one rib portion into the cable jacket substantially prevents the cord from being pulled through the gimbal assembly.

43. A multi-elevational tool support comprising:

a drum disposed to rotate about a central axis;

a spring disposed to bias rotation of the drum;

a power cord having first and second ends, the first end coupled to the drum, the second end coupleable to a tool, the power cord further including first and second electric lines;

the drum configured to windingly receive the cord thereabout;

the cord configured for being alternately wound and unwound with and against the bias of the spring as the tool is respectively raised and lowered;

a quick release electrical connector deployed between the first and second ends of the cord, the electrical connector configured to selectively electrically connect and disconnect the first and second ends of the cord; and a gimbal assembly deployed between the electrical connector and the second end of the cord, the cord extending through the gimbal assembly, the gimbal assembly couplable to the tool, the gimbal assembly configured to permit rotation of the tool about first and second axes.

* * * * *